United States Patent
Iwase et al.

(10) Patent No.: US 12,391,241 B2
(45) Date of Patent: Aug. 19, 2025

(54) VEHICLE DRIVING ASSIST DEVICE AND VEHICLE DRIVING ASSIST SYSTEM

(71) Applicant: SUBARU CORPORATION, Tokyo (JP)

(72) Inventors: Takuya Iwase, Tokyo (JP); Kazuaki Ueda, Tokyo (JP); Shingo Ugajin, Tokyo (JP); Toshihiro Hayashi, Tokyo (JP); Kazuo Nomoto, Tokyo (JP); Hiroto Kobayashi, Tokyo (JP); Takumi Funabashi, Tokyo (JP); Kenta Someya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 261 days.

(21) Appl. No.: 18/150,366

(22) Filed: Jan. 5, 2023

(65) Prior Publication Data
US 2023/0234575 A1    Jul. 27, 2023

(30) Foreign Application Priority Data

Jan. 24, 2022 (JP) .................................. 2022-008971

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2552/53* (2020.02);
(Continued)

(58) Field of Classification Search
CPC ............. B60W 30/09; B60W 30/0956; B60W 2552/53; B60W 2554/4044;
(Continued)

(56) References Cited

U.S. PATENT DOCUMENTS 6,405,132 B1 * 6/2002 Breed .................... G08G 1/161
  701/45
6,958,707 B1 * 10/2005 Siegel .................... G08G 1/087
  340/902

(Continued)

FOREIGN PATENT DOCUMENTS

DE    102019206410 A1 * 11/2020
JP    2016038837 A * 3/2016
JP    2016-224501 A    12/2016

OTHER PUBLICATIONS

DE-102019206410-A1 machine translation (Year: 2019).*
JP-2016038837-A machine translation (Year: 2016).*

*Primary Examiner* — Angelina M Shudy
(74) *Attorney, Agent, or Firm* — Rimon P.C.

(57) ABSTRACT

A vehicle driving assist device includes a processor that functions as a receiver, an emergency collision avoidance controller, and a preliminary collision avoidance controller. The receiver receives, in relation to an oncoming moving body moving in an oncoming lane adjacent to a traveling lane of a vehicle and having a velocity component in a direction opposite to a traveling direction of the vehicle, a risk degree calculated based on a history of a distance from a lane marker defining the oncoming lane to the oncoming moving body, by communication with a device outside the vehicle. Upon determination that the vehicle is highly likely to collide with an obstacle, the emergency collision avoidance controller performs emergency collision avoidance control. The preliminary collision avoidance controller recognizes the oncoming moving body as the obstacle in accordance with the risk degree, and performs preliminary control prior to the emergency collision avoidance control.

18 Claims, 19 Drawing Sheets

(52) U.S. Cl.
CPC . *B60W 2554/4044* (2020.02); *B60W 2554/80* (2020.02); *B60W 2756/10* (2020.02)

(58) Field of Classification Search
CPC .................. B60W 2554/80; B60W 2756/10; G08G 1/00; G05D 1/00; G06V 20/588
See application file for complete search history.

(56) References Cited

U.S. PATENT DOCUMENTS

| | | | | |
|---|---|---|---|---|
| 7,317,406 | B2* | 1/2008 | Wolterman | G08G 1/08 340/905 |
| 7,505,850 | B2* | 3/2009 | Kim | G08G 1/164 342/455 |
| 8,473,144 | B1* | 6/2013 | Dolgov | G08G 1/167 701/28 |
| 8,482,431 | B2* | 7/2013 | Kushi | G08G 1/161 340/901 |
| 8,867,025 | B1* | 10/2014 | Smalls | G08G 5/80 356/28 |
| 9,227,632 | B1* | 1/2016 | Lee | B60W 30/0956 |
| 9,308,917 | B2* | 4/2016 | Oh | H04N 13/211 |
| 9,463,795 | B2* | 10/2016 | Minemura | B60W 30/0956 |
| 11,136,026 | B2* | 10/2021 | Iwasaki | G06F 18/22 |
| 11,167,753 | B2* | 11/2021 | Ishioka | B60W 50/0097 |
| 11,458,964 | B2* | 10/2022 | Kashiwamura | B62D 15/025 |
| 11,465,619 | B2* | 10/2022 | Silva | B60W 30/0956 |
| 11,802,959 | B2* | 10/2023 | Drysch | G08G 1/165 |
| 12,077,190 | B2* | 9/2024 | Ng | B60W 60/00272 |
| 12,115,999 | B2* | 10/2024 | Yamaguchi | B60W 30/18159 |
| 12,304,468 | B2* | 5/2025 | Iwase | B60W 30/09 |
| 2002/0198660 | A1* | 12/2002 | Lutter | G08G 1/0965 342/455 |
| 2003/0016143 | A1* | 1/2003 | Ghazarian | G08G 1/0962 340/901 |
| 2003/0135317 | A1* | 7/2003 | Hijikata | B60K 31/18 701/96 |
| 2003/0191568 | A1* | 10/2003 | Breed | B60W 40/06 701/469 |
| 2004/0098196 | A1* | 5/2004 | Sekiguchi | G01S 17/931 340/436 |
| 2004/0193347 | A1* | 9/2004 | Harumoto | G08G 1/166 701/45 |
| 2004/0210364 | A1* | 10/2004 | Kudo | G08G 1/166 348/148 |
| 2005/0004760 | A1* | 1/2005 | Urai | G01S 13/931 340/436 |
| 2005/0159853 | A1* | 7/2005 | Takahashi | B60W 50/16 701/1 |
| 2010/0030430 | A1* | 2/2010 | Hayakawa | B60T 8/17557 701/1 |
| 2010/0082251 | A1* | 4/2010 | Kogure | B60T 8/17558 701/301 |
| 2010/0138115 | A1* | 6/2010 | Kageyama | B60R 21/0134 701/45 |
| 2010/0280751 | A1* | 11/2010 | Breed | G08G 1/161 701/414 |
| 2011/0298603 | A1* | 12/2011 | King | G08G 1/042 340/436 |
| 2012/0226392 | A1* | 9/2012 | Kataoka | G06V 20/588 701/1 |
| 2013/0024073 | A1* | 1/2013 | Son | B60W 30/0953 701/45 |
| 2015/0025706 | A1* | 1/2015 | Roth | B60W 30/16 701/1 |
| 2015/0175159 | A1* | 6/2015 | Gussner | B60W 10/20 701/1 |
| 2015/0177007 | A1* | 6/2015 | Su | G05D 1/0246 701/25 |
| 2015/0298692 | A1* | 10/2015 | Minemura | B60W 30/0956 701/1 |
| 2015/0310283 | A1* | 10/2015 | Mori | B60W 30/12 382/104 |
| 2016/0207534 | A1* | 7/2016 | Nishimura | B60W 30/18145 |
| 2017/0004365 | A1* | 1/2017 | Ono | G06V 20/588 |
| 2017/0008519 | A1* | 1/2017 | Vijayan | B60W 30/0956 |
| 2017/0120804 | A1* | 5/2017 | Kentley | B60R 21/01 |
| 2018/0154892 | A1* | 6/2018 | Tamura | G06V 20/56 |
| 2018/0174467 | A1* | 6/2018 | Fukuda | B60W 50/14 |
| 2018/0247538 | A1* | 8/2018 | Baek | B60W 30/18154 |
| 2018/0286095 | A1* | 10/2018 | Kusayanagi | B60R 1/27 |
| 2018/0370528 | A1* | 12/2018 | Rittger | G06V 20/588 |
| 2019/0061712 | A1* | 2/2019 | Melik-Barkhudarov | B60T 8/172 |
| 2019/0077459 | A1* | 3/2019 | Miura | B62D 15/025 |
| 2019/0088136 | A1* | 3/2019 | Nagata | G08G 1/163 |
| 2019/0193787 | A1* | 6/2019 | Matsumoto | B62D 6/00 |
| 2019/0243371 | A1* | 8/2019 | Nister | B60W 30/095 |
| 2019/0329766 | A1* | 10/2019 | Ishioka | B60W 30/09 |
| 2020/0023884 | A1* | 1/2020 | Mizoo | B60W 30/16 |
| 2020/0156642 | A1* | 5/2020 | Tochigi | B60W 10/04 |
| 2020/0238980 | A1* | 7/2020 | Goto | B60W 30/09 |
| 2020/0361455 | A1* | 11/2020 | Murakami | B60W 50/14 |
| 2020/0369267 | A1* | 11/2020 | Kashiwamura | B60W 60/0051 |
| 2020/0385020 | A1* | 12/2020 | Komuro | B60W 60/0017 |
| 2020/0391733 | A1* | 12/2020 | Kumagai | B60T 8/17558 |
| 2021/0070284 | A1* | 3/2021 | Nakamura | B60W 30/095 |
| 2021/0237719 | A1* | 8/2021 | Chen | F02D 11/107 |
| 2021/0261139 | A1* | 8/2021 | Senmyo | B60W 40/08 |
| 2021/0300352 | A1* | 9/2021 | Newman | B60W 30/095 |
| 2021/0300420 | A1* | 9/2021 | Matsunaga | G06V 20/588 |
| 2021/0354729 | A1* | 11/2021 | Ng | B60W 30/0956 |
| 2021/0370921 | A1* | 12/2021 | Silva | B60W 60/0027 |
| 2022/0105984 | A1* | 4/2022 | Kojo | B60W 30/12 |
| 2022/0144162 | A1* | 5/2022 | Edwards | B60Q 1/302 |
| 2022/0208008 | A1* | 6/2022 | Matsuoka | B60W 50/14 |
| 2022/0219690 | A1* | 7/2022 | Lee | B60W 50/0098 |
| 2022/0264455 | A1* | 8/2022 | Kwak | G08G 1/005 |
| 2022/0306098 | A1* | 9/2022 | Wada | B60W 40/06 |
| 2022/0315047 | A1* | 10/2022 | Probst | B60W 30/16 |
| 2023/0140569 | A1* | 5/2023 | Foster | B60W 60/0017 701/400 |
| 2023/0234572 | A1* | 7/2023 | Iwase | B60W 30/09 701/301 |
| 2023/0234573 | A1* | 7/2023 | Iwase | B60W 30/0956 701/26 |
| 2023/0234574 | A1* | 7/2023 | Funabashi | B60W 30/0956 701/301 |
| 2023/0234579 | A1* | 7/2023 | Ugajin | B60W 40/02 701/23 |
| 2023/0305576 | A1* | 9/2023 | Chase | G08G 1/096758 |
| 2023/0311864 | A1* | 10/2023 | Iwase | B60W 10/10 701/301 |
| 2023/0316919 | A1* | 10/2023 | Hashimoto | B60W 50/14 340/435 |
| 2024/0059323 | A1* | 2/2024 | Gerrese | H04W 4/023 |
| 2025/0087091 | A1* | 3/2025 | Hucek | G08G 1/096775 |

* cited by examiner

FIG. 10

| TIMING: t-2 | | TIMING: t-1 | | TIMING: t | | TOTAL RISK DEGREE | TRAJECTORY PATTERN |
|---|---|---|---|---|---|---|---|
| STATE | RISK DEGREE INTERMEDIATE VALUE | STATE | RISK DEGREE INTERMEDIATE VALUE | STATE | RISK DEGREE INTERMEDIATE VALUE | | |
| NEAR HOST VEHICLE | 3 | NEAR HOST VEHICLE | 3 | NEAR HOST VEHICLE | 3 | 9 | 1 |
| | | | | NEAR CENTER | 1 | 7 | 2 |
| | | | | NEAR HOST VEHICLE OPPOSITE SIDE | -1 | 5 | 3 |
| | | NEAR CENTER | 1 | NEAR HOST VEHICLE | 3 | 7 | 4 |
| | | | | NEAR CENTER | 1 | 5 | 5 |
| | | | | NEAR HOST VEHICLE OPPOSITE SIDE | -2 | 2 | 6 |
| | | NEAR HOST VEHICLE OPPOSITE SIDE | -1 | NEAR HOST VEHICLE | 3 | 5 | 7 |
| | | | | NEAR CENTER | 0 | 2 | 8 |
| | | | | NEAR HOST VEHICLE OPPOSITE SIDE | -1 | 1 | 9 |
| NEAR CENTER | 0 | NEAR HOST VEHICLE | 3 | NEAR HOST VEHICLE | 3 | 6 | 10 |
| | | | | NEAR CENTER | 1 | 4 | 11 |
| | | | | NEAR HOST VEHICLE OPPOSITE SIDE | -1 | 2 | 12 |
| | | NEAR CENTER | 0 | NEAR HOST VEHICLE | 3 | 3 | 13 |
| | | | | NEAR CENTER | 0 | 0 | 14 |
| | | | | NEAR HOST VEHICLE OPPOSITE SIDE | 1 | 1 | 15 |
| | | NEAR HOST VEHICLE OPPOSITE SIDE | 1 | NEAR HOST VEHICLE | 3 | 2 | 16 |
| | | | | NEAR CENTER | 0 | 1 | 17 |
| | | | | NEAR HOST VEHICLE OPPOSITE SIDE | 3 | 4 | 18 |
| NEAR HOST VEHICLE OPPOSITE SIDE | 1 | NEAR HOST VEHICLE | 1 | NEAR HOST VEHICLE | 3 | 5 | 19 |
| | | | | NEAR CENTER | 0 | 2 | 20 |
| | | | | NEAR HOST VEHICLE OPPOSITE SIDE | 1 | 3 | 21 |
| | | NEAR CENTER | 0 | NEAR HOST VEHICLE | 1 | 2 | 22 |
| | | | | NEAR CENTER | 0 | 1 | 23 |
| | | | | NEAR HOST VEHICLE OPPOSITE SIDE | 3 | 4 | 24 |
| | | NEAR HOST VEHICLE OPPOSITE SIDE | 3 | NEAR HOST VEHICLE | -1 | 3 | 25 |
| | | | | NEAR CENTER | 1 | 5 | 26 |
| | | | | NEAR HOST VEHICLE OPPOSITE SIDE | 3 | 7 | 27 |

| RISK LEVEL (RISK DEGREE) | NOTIFICATION | LONGITUDINAL AVOIDANCE | LATERAL AVOIDANCE | STEERING WHEEL STEERING SPEED |
| --- | --- | --- | --- | --- |
| LV = 3 (4 < R) | Y | PRIMARY DECELERATION BRAKING (0.4 G) | AVOID BY CROSSING LANE | 240 DEG/S |
| LV = 2 (2 < R) | Y | SUPPRESS ACCELERATION (DECELERATE BY ACCLERATOR PEDAL RELEASE) | AVOID BY STRADDLING LANES | 80 DEG/S |
| LV = 1 (0 < R) | N | SUPPRESS ACCELERATION (LIMIT ACCELERATION SUPPRESSION) | AVOID BY BEING IN SAME LANE | 10 DEG/S |
| LV = 0 (R = 0) | N | - | - | - |

FIG. 19

VEHICLE DRIVING ASSIST DEVICE AND VEHICLE DRIVING ASSIST SYSTEM

CROSS-REFERENCE TO RELATED APPLICATIONS

The present application claims priority from Japanese Patent Application No. 2022-008971 filed on Jan. 24, 2022, the entire contents of which are hereby incorporated by reference.

BACKGROUND

The disclosure relates to a vehicle driving assist device and a vehicle driving assist system having a function of performing collision avoidance control in response to an obstacle.

In vehicles such as an automobile, driving assist devices for assisting driving operations of a driver have been put to practical use for the purpose of alleviating a burden of the driving operations of the driver and achieving improvements in safety. With this type of driving assist device, various driving modes are set. These driving modes include, for example, a manual driving mode for performing steering and acceleration/deceleration in accordance with independent driving operations by the driver, a driving assist mode for performing steering assist control and acceleration/deceleration control on the premise of independent driving operations by the driver, and a driving assist mode for causing a vehicle to travel without using any driving operations by the driver (so-called automatic driving mode).

The driving assist control in each of the driving assist modes is basically realized by providing an adaptive cruise control (ACC) function and an active lane keep centering (ALKC) control function, and the like. With such driving assist control, the vehicle can be caused to travel along a traveling lane while maintaining an inter-vehicle distance from a preceding vehicle.

Further, as a technique related to active safety of the driving assist device, various proposals have been made for performing collision avoidance control with an obstacle present on a traveling path ahead of the host vehicle (refer to, for example, Japanese Unexamined Patent Application Publication (JP-A) No. 2016-224501). In the technique of JP-A No. 2016-224501, a collision predictor identifies an expected collision region with an obstacle from a traveling trajectory (target traveling path) of the host vehicle and a position, a shape, a movement direction, and the like of the obstacle. Further, the collision predictor integrates a collision probability value of collision with the obstacle in an expected collision region. Then, in a case where an integrated value of the collision probability value becomes large in one or more expected collision regions identified at points in time, a collision determination unit generates an alert signal.

SUMMARY

An aspect of the disclosure provides a vehicle driving assist device. The vehicle driving assist device includes a processor configured to function as a receiver, an emergency collision avoidance controller, and a preliminary collision avoidance controller. The receiver is configured to receive, in relation to an oncoming moving body moving in an oncoming lane adjacent to a traveling lane of a vehicle and having a velocity component in a direction opposite to a traveling direction of the vehicle, a risk degree calculated based on a history of a relative lane marker lateral position that is a distance from a lane marker defining the oncoming lane to the oncoming moving body, by communication with a device outside the vehicle. The emergency collision avoidance controller is configured to, upon determination that the vehicle is highly likely to collide with an obstacle, perform emergency collision avoidance control for avoiding collision of the vehicle with the obstacle. The preliminary collision avoidance controller is configured to recognize the oncoming moving body as the obstacle in accordance with the risk degree, and perform preliminary collision avoidance control in response to the oncoming moving body recognized as the obstacle prior to the emergency collision avoidance control.

An aspect of the disclosure provides a vehicle driving assist device. The vehicle driving assist device includes a processor configured to function as a lateral position calculator, a risk degree calculator, and a transmitter. The lateral position calculator is configured to calculate, every set cycle, a distance from a lane marker defining a traveling lane of a vehicle to the vehicle as a relative lane marker lateral position, every set cycle. The risk degree calculator is configured to calculate a risk degree for the vehicle based on a history of the relative lane marker lateral position within a time period set in advance. The transmitter is configured to transmit the risk degree to an oncoming moving body moving in an oncoming lane adjacent to the traveling lane of the vehicle and having a velocity component in a direction opposite to a traveling direction of the vehicle.

An aspect of the disclosure provides a vehicle driving assist system. The vehicle driving assist system includes a processor configured to function as a lateral position calculator, a risk degree calculator, a transmitter, a receiver, an emergency collision avoidance controller, and a preliminary collision avoidance controller. The lateral position calculator is configured to calculate, in relation to an oncoming moving body moving in an oncoming lane adjacent to a traveling lane of a vehicle and having a velocity component in a direction opposite to a traveling direction of the vehicle, a distance from a lane marker defining the oncoming lane to the oncoming moving body as a relative lane marker lateral position. The distance is to be calculated outside the vehicle every set cycle. The risk degree calculator is configured to calculate a risk degree for the oncoming moving body based on a history of the relative lane marker lateral position within a time period set in advance. The transmitter is configured to transmit the risk degree to the vehicle. The receiver is mounted on the vehicle and configured to receive the risk degree. The emergency collision avoidance controller is mounted onto the vehicle and configured to perform, upon determination that the vehicle is highly likely to collide with an obstacle, emergency collision avoidance control for avoiding collision of the vehicle with the obstacle. The preliminary collision avoidance controller is mounted on the vehicle and configured to recognize the oncoming moving body as the obstacle in accordance with the risk degree, and perform preliminary collision avoidance control in response to the oncoming moving body recognized as the obstacle prior to the emergency collision avoidance control.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 10 is an explanatory view illustrating a risk determination map.

FIG. 19 is an explanatory view illustrating control contents of preliminary collision avoidance control.

DETAILED DESCRIPTION

An oncoming vehicle or the like traveling in an oncoming lane adjacent to a host vehicle traveling lane is basically present at a position separated in a vehicle width direction from a target traveling path of the host vehicle. Accordingly, the oncoming vehicle or the like may not be an applicable target of collision avoidance control. In this case, for example, in a case where the oncoming vehicle or the like suddenly enters the traveling lane of the host vehicle due to the inattentiveness or the like of the driver driving the oncoming vehicle or the like, it may be difficult to realize sufficient collision avoidance control in response to the oncoming vehicle. In particular, it may be more difficult to realize sufficient collision avoidance control in response to an oncoming vehicle or the like in a case where the oncoming vehicle or the like is traveling on a curve or the like with poor visibility.

It is desirable to provide a vehicle driving assist device and a vehicle driving assist system that can maintain sufficient safety even when an oncoming vehicle or the like suddenly enters a traveling lane of a host vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, quantities of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
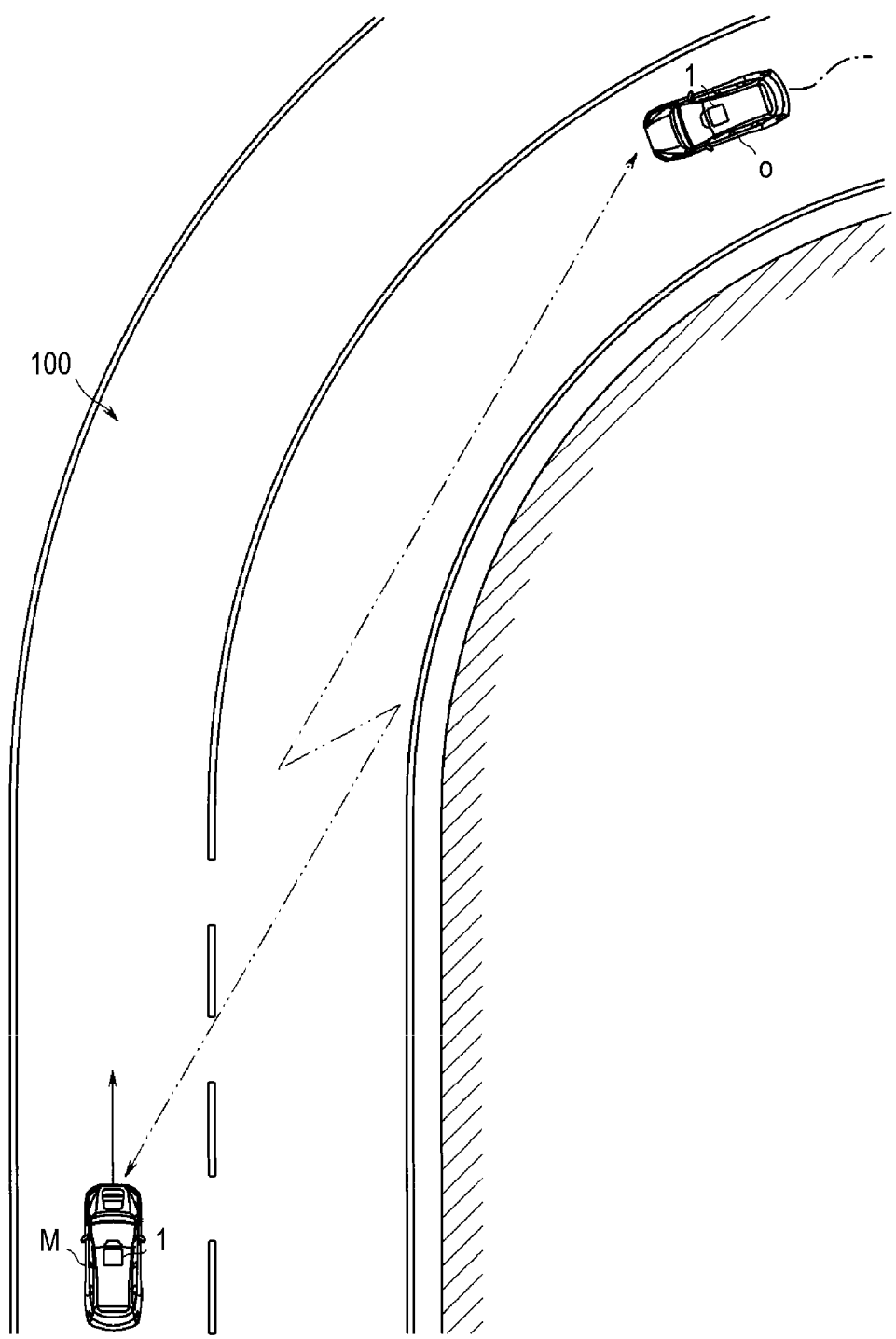
FIG. 1 is a schematic configuration diagram of a driving assist system.

As illustrated in FIG. 1, a driving assist system 100 of the present embodiment includes, as a plurality of vehicles that can wirelessly communicate with each other, a host vehicle M and an oncoming vehicle (oncoming moving body O).

A driving assist device 1 is mounted on each of the host vehicle M and the oncoming moving body O.

Figure 2:
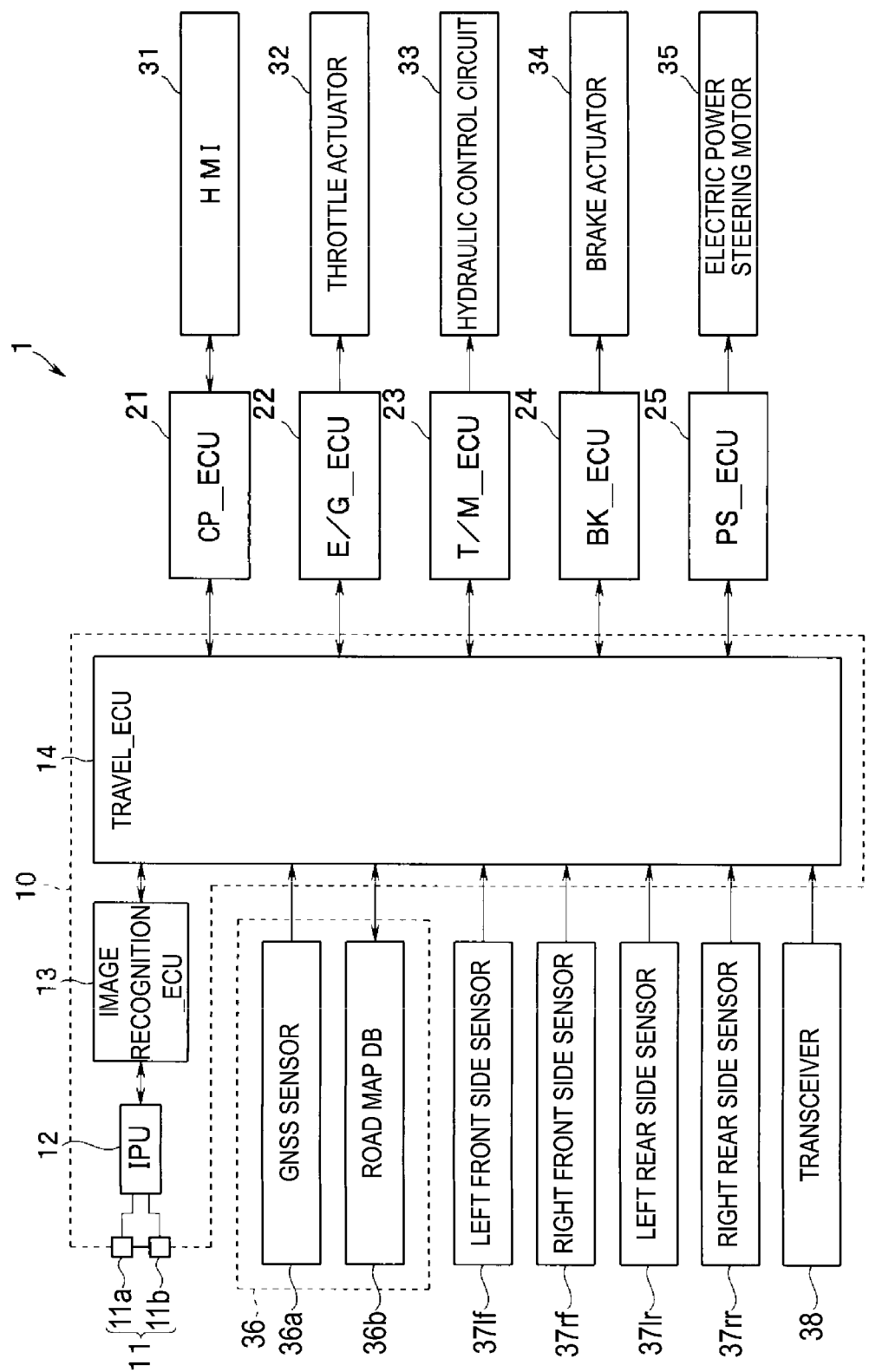
FIG. 2 is a schematic configuration diagram of a driving assist device.
Figure 3:
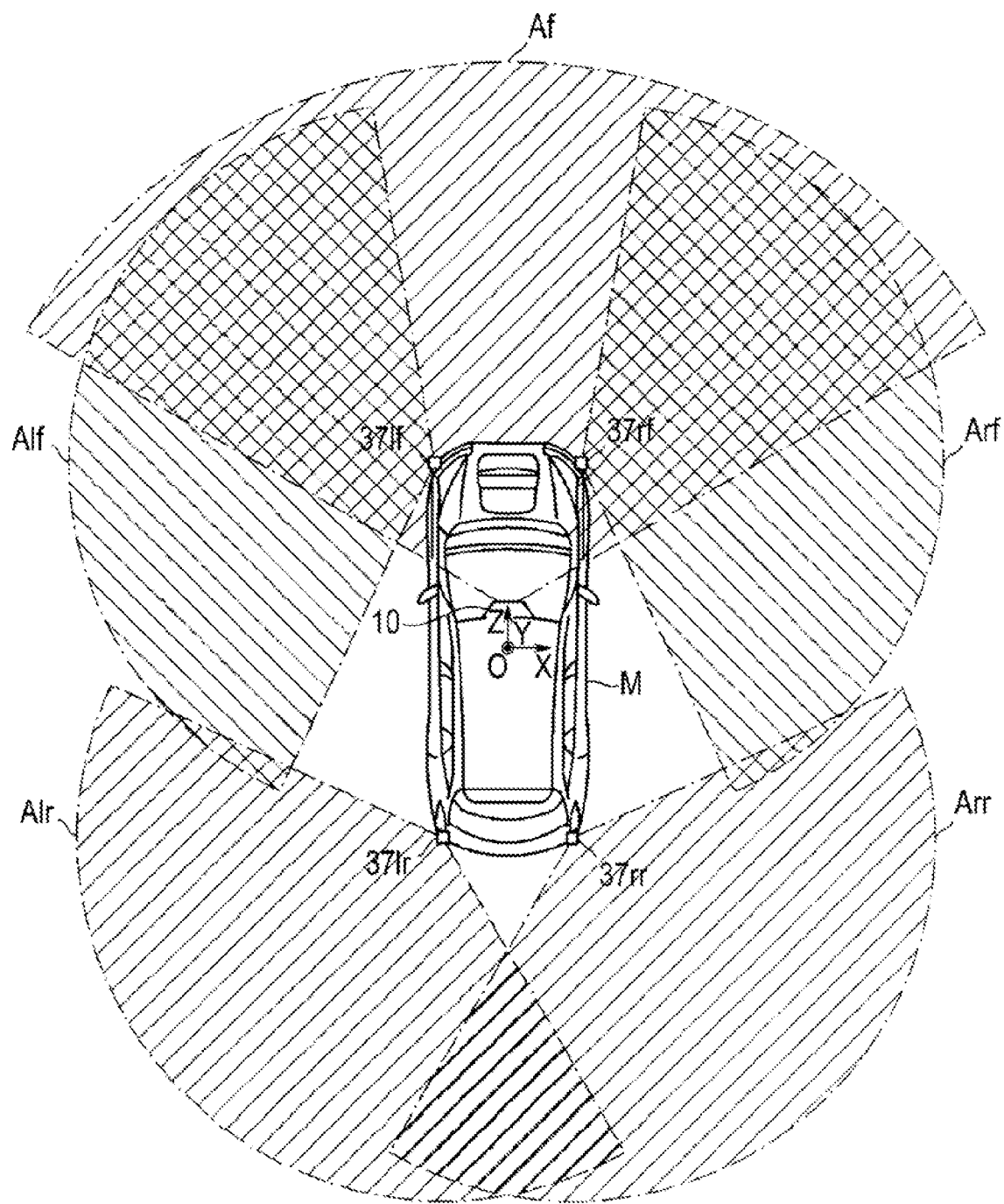
FIG. 3 is an explanatory view illustrating a monitoring region of a stereo camera and radar.

Next, a configuration of the driving assist device 1 mounted on the host vehicle M will be described with reference to FIGS. 2 and 3. The driving assist device 1 is configured to include a camera unit 10 fixed to an upper center of a front part in a cabin of the vehicle (host vehicle) M, for example.

This camera unit 10 is configured to include a stereo camera 11, an image processing unit (IPU) 12, an image recognition unit (image recognition_ECU) 13, and a traveling control unit (travel_ECU) 14.

The stereo camera 11 includes a main camera 11a and a sub-camera 11b. The main camera 11a and the sub-camera 11b are each constituted by a complementary metal-oxide semiconductor (CMOS), for example.

The main camera 11a and the sub-camera 11b are disposed in left-right symmetric positions across a center in a vehicle width direction.

The main camera 11a and the sub-camera 11b capture stereo images of a traveling environment in an area Af (refer to FIG. 3) in front and outside of the host vehicle from different viewpoints. Image capturing cycles of the main camera 11a and sub-camera 11b are synchronized with each other.

The IPU 12 performs predetermined image processing on traveling environment images captured by the stereo camera 11. The IPU 12 thus detects edges of various objects represented in the images, such as solid objects or lane markers on a road surface. Then, the IPU 12 finds distance information from a position deviation amount of the corresponding edges in the left and right images. In this way, the IPU 12 generates image information (distance image information) including distance information.

On the basis of the distance image information and the like received from the IPU 12, the image recognition_ECU 13 determines the road curvature (1/m) of the lane markers defining the left and right sides of the lane in which the host vehicle M is traveling (host vehicle traveling path), and the width between the left and right lane markers (lane width). Further, the image recognition_ECU 13 determines the road curvature of the lane markers defining the left and right sides of a lane or the like adjacent to the lane in which the host vehicle M is traveling, and the width between the left and right lane markers. Various methods of determining the curvatures and the lane widths are known. For example, the image recognition_ECU 13 performs binarization processing based on luminance for each pixel on a distance image.

As a result, the image recognition_ECU 13 extracts lane marker candidate points on the road. Further, the image recognition_ECU 13 performs curve approximation by the least-squares method or the like on a point sequence of the extracted lane marker candidate points. The image recognition_ECU 13 thus determines the curvatures of the left and right lane markers for each predetermined section. Furthermore, the image recognition_ECU 13 calculates the lane width from the difference between the curvatures of both the left and right lane markers.

Then, the image recognition_ECU 13 calculates a lane center, a lateral position deviation of the host vehicle, and the like on the basis of the curvatures of the left and right lane markers and the lane width. Herein, the lateral position deviation of the host vehicle is a distance from the lane center to the center of the host vehicle M in the vehicle width direction.

Further, the image recognition_ECU 13 performs predetermined pattern matching or the like on the distance image information. The image recognition_ECU 13 thus recognizes solid objects, such as a guardrail, a curb, a median strip, and nearby vehicles present along the road. Herein, upon recognizing the solid object, the image recognition_ECU 13 recognizes, for example, a type of the solid object, a distance to the solid object, a velocity of the solid object, and a relative velocity between the solid object and the host vehicle M.

Each of the various types of information recognized in the image recognition_ECU 13 is output to a travel_ECU 14 as traveling environment information.

In one embodiment, the image recognition_ECU 13 may serve as a "traveling environment recognizer" that recognizes the traveling environment information outside the vehicle along with the stereo camera 11 and the IPU 12.

The travel_ECU 14 is a control unit for comprehensively controlling the driving assist device 1.

This travel_ECU 14 is coupled, via an in-vehicle communication line such as a controller area network (CAN), to various control units. The various control units include a cockpit control unit (CP_ECU) 21, an engine control unit (E/G_ECU) 22, a transmission control unit (T/M_ECU) 23, a braking control unit (BK_ECU) 24, and a power steering control unit (PS_ECU) 25.

Further, the travel_ECU 14 is coupled to various types of sensors including a locator unit 36, a left front side sensor 37*lf*, a right front side sensor 37*rf*, a left rear side sensor 37*lr*, and a right rear side sensor 37*rr*.

Furthermore, the travel_ECU 14 is coupled to a transceiver 38 for performing wireless communication with an external device outside the host vehicle M.

The CP_ECU 21 is coupled to a human machine interface (HMI) 31 disposed around the driver's seat. The HMI 31 includes, for example, operation switches for setting and executing various types of driving assist controls and the like, a mode switch for switching the driving assist mode, a steering touch sensor that detects a steering state of the driver, a turn signal switch, a driver monitoring system (DMS) that performs facial recognition, eye detection, or the like of the driver, a touch panel type display, a combination meter, and a speaker.

The CP_ECU 21, upon receiving a control signal from the travel_ECU 14, notifies the driver, as appropriate, of various types of alerts related to a preceding vehicle or the like, an implementation state of the driving assist control, and various information related to the traveling environment and the like of the host vehicle M, by display, audio, or the like through the HMI 31.

Further, the CP_ECU 21 outputs various input information to the travel_ECU 14, such as an on or off operation state of each of the various driving assist controls input by the driver through the HMI 31, a vehicle velocity Vs set for the host vehicle M (set vehicle velocity), and an operation state of a turn signal switch.

The E/G_ECU 22 is coupled, at its output side, to a throttle actuator 32 of an electronic control throttle or the like. Further, the E/G_ECU 22 is coupled, at its input side, to various sensors such as an accelerator sensor (not illustrated).

The E/G_ECU 22 controls the driving of the throttle actuator 32 on the basis of control signals from the travel_ECU 14, detection signals from various sensors, or the like. This causes the E/G_ECU 22 to adjust an amount of intake air of the engine and generate a desired engine output. Further, the E/G_ECU 22 outputs signals of an accelerator pedal position and the like detected by the various sensors to the travel_ECU 14.

The T/M_ECU 23 is coupled, at its output side, to a hydraulic control circuit 33. Further, the T/M_ECU 23 is coupled, at its input side, to various sensors such as a shift position sensor (not illustrated). The T/M_ECU 23 performs hydraulic control for the hydraulic control circuit 33 on the basis of an engine torque signal estimated by the E/G_ECU 22, detection signals from various sensors, and the like. Thus, the T/M_ECU 23 operates frictional engagement elements, pulleys, and the like provided in an automatic transmission, and causes the engine output to shift at a desired transmission ratio. Further, the T/M_ECU 23 outputs signals of a shift position and the like detected by various sensors to the travel_ECU 14.

The BK_ECU 24 is coupled, at its output side, to a brake actuator 34. The brake actuator 34 adjusts the brake fluid pressure to be fed to brake wheel cylinders provided for respective wheels. Further, the BK_ECU 24 is coupled, at its input side, to various sensors such as a brake pedal sensor, a yaw rate sensor, front/rear acceleration sensors, and a vehicle speed sensor (not illustrated).

The BK_ECU 24 controls the driving of the brake actuator 34 on the basis of control signals from the travel_ECU 14 or detection signals from various sensors. The BK_ECU 24 thus generates, at each wheel, a braking force for performing forced braking control, yaw rate control, and the like on the host vehicle M, as appropriate. Further, the BK_ECU 24 outputs signals of a brake operation state, a yaw rate, a forward/reverse acceleration, a vehicle velocity (host vehicle velocity), and the like detected by various sensors to the travel_ECU 14.

The PS_ECU 25 is coupled, at its output side, to an electric power steering motor 35. The electric power steering motor 35 applies a steering torque to a steering mechanism by a rotational force of the motor. Further, the PS_ECU 25 is coupled, at its input side, to various sensors such as a steering torque sensor and a steering angle sensor.

The PS_ECU 25 controls the driving of the electric power steering motor 35 on the basis of control signals from the travel_ECU 14 or detection signals from various sensors. As a result, the PS_ECU 25 generates a steering torque for the steering mechanism. Further, the PS_ECU 25 outputs signals of the steering torque, a steering angle, and the like detected by various sensors to the travel_ECU 14.

The locator unit 36 includes a global navigation satellite system (GNSS) sensor 36*a* and a high-precision road map database (road map DB) 36*b*.

The GNSS sensor 36*a* receives positioning signals transmitted from positioning satellites, and thus measures a position (latitude, longitude, altitude, and the like) of the host vehicle M.

The road map DB 36*b* is a large-capacity storage medium such as a hard disk drive (HDD). This road map DB 36*b* stores high-precision road map information (a dynamic map). The road map information includes, for example, lane width data, lane center position coordinate data, azimuth angle data of the lane, and speed limit data, as lane data when performing automatic driving. The lane data is stored for each lane on the road map at an interval of several meters. On the basis of a request signal from the travel_ECU 14, the road map DB 36*b* outputs to the travel_ECU 14, as the traveling environment information, road map information of a set range based on the host vehicle position measured by the GNSS sensor 36*a*, for example.

In one embodiment, the road map DB 36*b* may serve as a "traveling environment recognizer" that recognizes the traveling environment information outside the vehicle along with the GNSS sensor 36*a*.

The left front side sensor 37*lf* and the right front side sensor 37*rf* are each constituted by, for example, a millimeter wave radar. The left front side sensor 37*lf* and the right front side sensor 37*rf* are disposed respectively on the left and right sides of a front bumper, for example. The left front side sensor 37*lf* and the right front side sensor 37*rf* detect, as the traveling environment information, solid objects present in regions Alf, Arf (refer to FIG. 3) that are left and right oblique front and side regions of the host vehicle M and difficult to recognize in images of the stereo camera 11.

The left rear side sensor 37*lr* and the right rear side sensor 37*rr* are each constituted by, for example, a millimeter wave radar. The left rear side sensor 37*lr* and the right rear side sensor 37*rr* are disposed respectively on left and right sides of a rear bumper, for example. The left rear side sensor 37*lr* and the right rear side sensor 37*rr* detect, as the traveling environment information, solid objects present in regions Alr, An (refer to FIG. 3) that are left and right oblique rear and side regions of the host vehicle M and difficult to recognize by the left front side sensor 37*lf* and the right front side sensor 37*rf*.

Herein, in a case where each sensor is constituted by a millimeter wave radar, the millimeter wave radar detects mainly a solid object such as a parallel traveling vehicle, a following vehicle, or the like by analyzing reflected waves reflected by an object with respect to the electric waves output from the millimeter wave radar. In one example, each radar detects, as information related to the solid object, the lateral width of the solid object, the position of a representative point of the solid object (relative position with respect to the host vehicle M), the velocity of the solid object, and the like.

In one embodiment, the left front side sensor 37*lf*, the right front side sensor 37*rf*, the left rear side sensor 37*lr*, and the right rear side sensor 37*rr* may serve as "a traveling environment recognizer" that recognizes the traveling environment information outside the vehicle.

Note that coordinates of each target outside the vehicle included in the traveling environment information and respectively recognized by the image recognition_ECU 13, the locator unit 36, the left front side sensor 37*lf*, the right front side sensor 37*rf*, the left rear side sensor 37*lr*, and the right rear side sensor 37*rr* are converted to coordinates of a three-dimensional coordinate system in which the center of the host vehicle M is set as the origin (refer to FIG. 3), for example, in the travel_ECU 14.

The transceiver 38 performs various communication with an external device. In one embodiment, the transceiver 38 performs inter-vehicle communication with a peripheral vehicle, and road-vehicle communication with infrastructure and the like provided around the road, for example.

The transceiver 38 transmits, as transmission information for other vehicles, infrastructure, and the like present around the host vehicle M, a position (latitude, longitude, altitude, and the like) of the host vehicle M on a road map, a vehicle velocity V of the host vehicle M, a movement direction of the host vehicle M, and a risk degree R (described below) when the host vehicle M is traveling on a traveling lane, for example.

Further, the transceiver 38 receives, as reception information from other vehicles, infrastructure, and the like present around the host vehicle M, positions (latitudes, longitudes, altitudes, and the like) of other vehicles and the like on the road map, vehicle velocities of the other vehicles and the like, movement directions of the other vehicles and the like, and risk degrees R when the other vehicles are traveling, for example.

In one embodiment, the transceiver 38 may serve as a "transmitter" and a "receiver."

The driving modes set in the travel_ECU 14 include a manual driving mode, a first travel control mode and a second travel control mode as modes for travel control, and a safe stop mode. These driving modes are each selectively switchable in the travel_ECU 14 on the basis of, for example, the operation status of the mode switch provided to the HMI 31, for example.

Herein, the manual driving mode is a driving mode in which the driver holds the steering wheel. That is, the manual driving mode is a driving mode in which the driver causes the host vehicle M to travel in accordance with driving operations such as a steering operation, an acceleration operation, and a braking operation, for example.

Similarly, the first travel control mode is a driving mode in which the driver holds the steering wheel.

That is, the first travel control mode is a so-called semi-automated driving mode in which the host vehicle M is caused to travel while reflecting the driving operations by the driver. This first travel control mode is realized by, for example, the travel_ECU 14 outputting various control signals to the E/G_ECU 22, the BK_ECU 24, and the PS_ECU 25. In the first travel control mode, mainly adaptive cruise control (ACC), active lane keep centering (ALKC) control, active lane keep bouncing control, lane change control, and the like are performed in combination as appropriate. This makes it possible for the host vehicle M to travel along the target traveling path. Furthermore, in the first travel control mode, the lane change control can be performed when the turn signal switch is operated by the driver.

Herein, the adaptive cruise control is basically performed on the basis of the traveling environment information input from the image recognition_ECU 13 or the like.

In one example, in a case where a preceding vehicle is recognized ahead of the host vehicle M by the image recognition_ECU 13 or the like, the travel_ECU 14 performs adaptive travel control as a part of the adaptive cruise control. In this adaptive travel control, the travel_ECU 14 sets a target inter-vehicle distance Lt and a target vehicle velocity Vt on the basis of a vehicle velocity Vl of the preceding vehicle or the like. Then, the travel_ECU 14 performs acceleration/deceleration control for the host vehicle Mon the basis of the target inter-vehicle distance Lt and the target vehicle velocity Vt. In this way, the travel_ECU 14 basically causes the host vehicle M to travel following the preceding vehicle in a state of maintaining a vehicle velocity V at the target vehicle velocity Vt while maintaining an inter-vehicle distance L at the target inter-vehicle distance Lt.

On the other hand, for example, in a case where no preceding vehicle is recognized ahead of the host vehicle M by the image recognition_ECU 13 or the like, the travel_ECU 14 performs constant velocity travel control as a part of the adaptive cruise control. In this constant velocity travel control, the travel_ECU 14 sets the set vehicle velocity Vs input by the driver as the target vehicle velocity Vt. Then, the travel_ECU 14 performs acceleration/deceleration control for the host vehicle M on the basis of the target vehicle velocity Vt. In this way, the travel_ECU 14 maintains the vehicle velocity V of the host vehicle M at the set vehicle velocity Vs.

Further, the active lane keep centering control and the active lane keep bouncing control are basically performed on the basis of the traveling environment information input from at least one of the image recognition_ECU 13 or the locator unit 36. That is, the travel_ECU 14 sets a target traveling path Rm at the center of the host vehicle traveling lane along the left and right lane markers on the basis of, for example, the lane marker information or the like included in the traveling environment information. Then, the travel_ECU 14 keeps the host vehicle M in the center of the lane by performing feed-forward control, feed-back control, and the like for steering on the basis of the target traveling path Rm. Further, upon determination that the host vehicle M is likely to deviate from the host vehicle traveling lane due to the influence of a lateral wind, a cant of the road, or the like, the travel_ECU 14 suppresses the lane deviation by forced steering control.

Further, lane change control is basically performed on the basis of the traveling environment information input from the image recognition_ECU 13, the left front side sensor 37*lf*, the right front side sensor 37*rf*, the left rear side sensor 37*lr*, and the right rear side sensor 37*rr*. This lane change control is executed when, for example, the turn signal switch is operated by the driver. That is, the travel_ECU 14 recognizes an adjacent lane present in the operation direction of the turn signal switch on the basis of the traveling environment information. Further, the travel_ECU 14 recognizes whether a vehicle or the like that inhibits a lane change is present in the adjacent lane. Then, the travel_ECU 14, upon determination that space exists for a lane change in the adjacent lane, performs the lane change to the adjacent lane. This lane change control is performed in coordination with the adaptive cruise control.

The second travel control mode is a driving mode in which the host vehicle M is caused to travel without driving operation by the driver, that is, without holding the steering wheel or performing an acceleration operation or a braking operation. That is, the second travel control mode is a so-called automatic driving mode in which the host vehicle M is caused to travel autonomously without driving operation by the driver. This second travel control mode is realized by, for example, the travel_ECU 14 outputting various control signals to the E/G_ECU 22, the BK_ECU 24, and the PS_ECU 25. In the second travel control mode, mainly preceding-vehicle adaptive control, active lane keep centering control, active lane keep bouncing control, and the like are performed in combination as appropriate.

This makes it possible for the host vehicle M to travel along the target route (route map information). Furthermore, in the second travel control mode, lane change control can also be performed. Note that, in the second travel control mode, lane change control is performed automatically, as appropriate, not only when the turn signal switch is operated by the driver, but also in accordance with a travel route up to a destination set in the host vehicle M, traveling environment information, and the like.

The safe stop mode is a mode for automatically stopping the host vehicle M at a side strip or the like. This safe stop mode is executed, for example, in a case where the traveling based on the second travel control mode becomes uncontinuable during the traveling in the second travel control mode, and the driver fails to take over the driving operation, for example (that is, where the second travel control mode cannot transition to the manual driving mode or to the first travel control mode).

Further, in each of the driving modes described above, the travel_ECU 14 performs emergency collision avoidance control, as appropriate, for an obstacle such as a vehicle that is highly likely to collide with the host vehicle M. This emergency collision avoidance control includes, for example, emergency braking (autonomous emergency braking (AEB)) control and emergency steering control.

Figure 4:
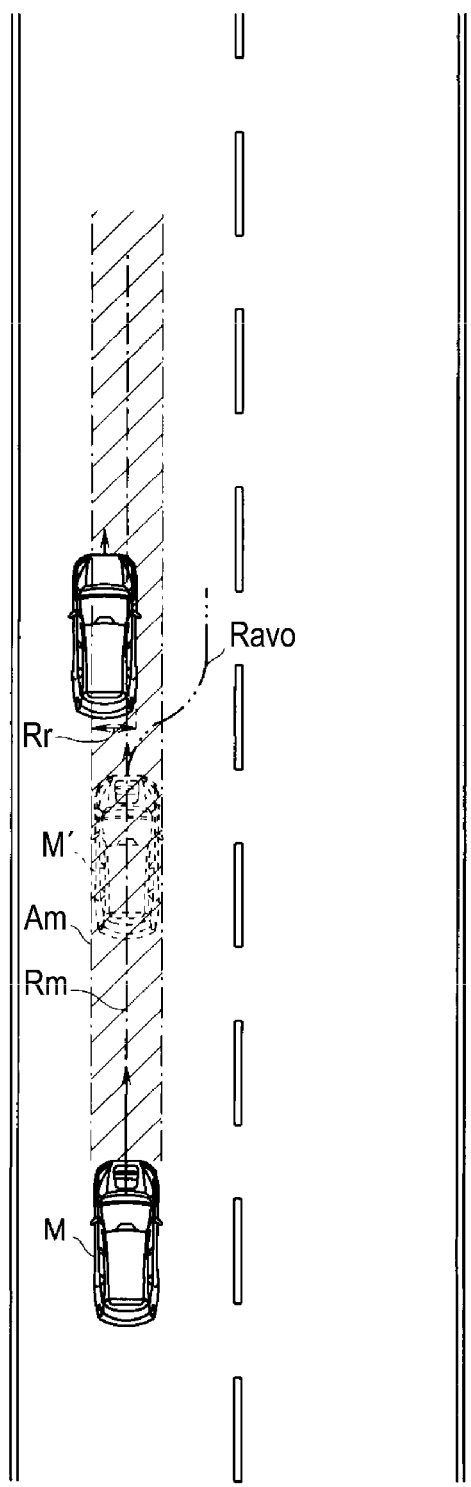
FIG. 4 is an explanatory view illustrating an obstacle present on a target traveling path ahead of a host vehicle.

The emergency braking control is basically control for avoiding a collision with an obstacle present in the target traveling path Rm ahead of the host vehicle M by braking. In the emergency braking control, the travel_ECU 14 sets, for example, a target traveling region Am ahead of the host vehicle M, as illustrated in FIG. 4. This target traveling region Am includes a predetermined width (greater than or equal to the vehicle width of the host vehicle M, for example) centered on the target traveling path Rm. Further, the travel_ECU 14 detects an obstacle such as a preceding vehicle, a stopped vehicle, or the like present in the target traveling region Am on the basis of the traveling environment information. Furthermore, the travel_ECU 14 calculates, as a predicted collision time with the obstacle, a time-to-collision (longitudinal time-to-collision) $TTCz$ in a front-rear direction of the host vehicle M. This longitudinal time-to-collision $TTCz$ is calculated on the basis of a relative velocity and a relative distance between the host vehicle M and the obstacle.

Then, the travel_ECU 14 executes primary braking control when the longitudinal time-to-collision $TTCz$ becomes less than a first threshold value $Tth1$ set in advance. When the primary braking control is started, the travel_ECU 14 decelerates the host vehicle M by using a first target deceleration $a1$ (0.4 G, for example) set in advance.

Further, the travel_ECU 14 executes secondary braking control when the longitudinal time-to-collision $TTCz$ is less than a second threshold value $Tth2$ (where $Tth2<Tth1$) set in advance. When secondary braking control is started, the travel_ECU 14 decelerates the host vehicle M until the relative velocity relative to the obstacle is "0" by using a second target deceleration $a2$ (1 G, for example) set in advance.

Emergency steering control is control for avoiding a collision with an obstacle present in the target traveling path ahead of the host vehicle M by steering. Upon determination that collision with the obstacle cannot be avoided by, for example, secondary braking control, the travel_ECU 14 executes emergency steering control instead of or in conjunction with emergency braking control.

In one example, the travel_ECU 14 executes the emergency steering control (refer to a host vehicle M' in FIG. 4, for example) when the longitudinal time-to-collision $TTCz$ is less than a third threshold value $Tth3$ (where $Tth3<Tth2$) set in advance.

In this emergency steering control, the travel_ECU 14 sets a target lateral position to the side of the obstacle. Further, the travel_ECU 14 sets a new target traveling path Ravo for causing the host vehicle M to reach the target lateral position. This new target traveling path Ravo is set by, for example, creating two sections: a steering away section for causing the host vehicle M to head toward the side of the obstacle, and a steering back section for returning an orientation of the host vehicle M to a direction along the host vehicle traveling path. Then, the travel_ECU 14 executes steering control along the new target traveling path Ravo.

Note that the travel_ECU 14 may variably set each of the first to third threshold values Tth1 to Tth3 in accordance with an overlap ratio of the obstacle to the host vehicle M in the vehicle width direction. This overlap ratio Rr is calculated, for example, on the basis of an amount by which the obstacle enters the target traveling region Am. Then, the travel_ECU 14 sets each threshold value so that the first to third threshold values Tth1 to Tth3 increase as the overlap ratio Rr increases by using a map or the like set in advance, for example.

However, when the host vehicle M is traveling on a road in which a median strip is not present, a case is expected where an oncoming moving body O present in the oncoming lane suddenly enters the traveling lane of the host vehicle M. Here, in the present embodiment, the oncoming moving body O refers to an oncoming vehicle (including a two-wheeled vehicle), a pedestrian, or the like that moves with a velocity component in a direction opposite to the movement direction of the host vehicle M. To realize collision avoidance with such an oncoming moving body O, the travel_ECU 14 of the present embodiment extends and applies emergency collision avoidance control in response to the oncoming moving body O entering the traveling lane of the host vehicle M from the oncoming lane of the road without the median strip.

Prior to the emergency collision avoidance control targeting the oncoming moving body O, the travel_ECU 14 performs, as appropriate, preliminary collision avoidance control, as necessary. This preliminary collision avoidance control is control for suppressing a risk of collision of the host vehicle M with the oncoming moving body O in advance.

To execute preliminary collision avoidance control, the travel_ECU 14 receives, via the transceiver 38, information related to various moving bodies such as other vehicles present around the host vehicle M. That is, the travel_ECU 14 receives, as information related to other vehicles and the like, positions (latitudes, longitudes, altitudes, and the like) of other vehicles and the like on the road map, vehicle velocities of the other vehicles and the like, movement directions of the other vehicles and the like, risk degrees R when the other vehicles and the like are traveling, and the like.

Further, the travel_ECU 14 calculates the risk degree R of the host vehicle M as information for transmission to the other vehicles or the like present around the host vehicle M. That is, the travel_ECU 14 calculates respective distances from the left and right lane markers defining the traveling lane of the host vehicle M to the host vehicle M (distance from the left and right lane markers to left and right lateral ends of the host vehicle M, for example) as left and right relative lane marker lateral positions. The calculation of these relative lane marker lateral positions is performed on the basis of the traveling environment information, for example.

Further, the calculation of the relative lane marker lateral positions are performed every calculation cycle set in advance. Then, the travel_ECU 14 calculates the risk degree R on the basis of a history of the relative lane marker lateral positions calculated every set cycle within a time period set in advance.

Figure 6:
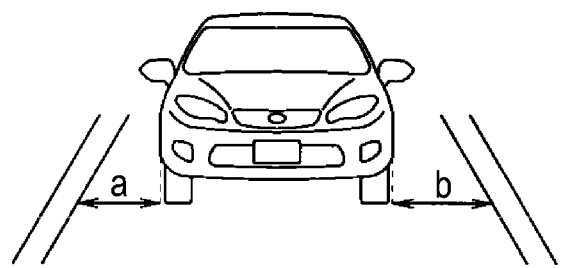
FIG. 6 is an explanatory view illustrating relative lane marker lateral positions of the host vehicle.

In one embodiment, the travel_ECU 14 respectively calculates the distances from the left and right lane markers defining the traveling lane of the host vehicle M to the host vehicle M as left and right relative lane marker lateral positions a, b (see FIG. 6). Then, the travel_ECU 14 retains, as a history, the calculated left and right relative lane marker lateral positions a, b over a time period 3T (seconds) set in advance.

Further, the travel_ECU 14 respectively calculates a risk degree intermediate value for the oncoming moving body O on the basis of the history of the left and right relative lane marker lateral positions a, b every interval set in advance.

In the present embodiment, the risk degree intermediate value is calculated on the basis of the history of the relative lane marker lateral positions a, b for every time the oncoming moving body O moves for T seconds, for example.

In the calculation of this risk degree intermediate value, the travel_ECU 14 respectively calculates an average value a_ave of the relative lane marker lateral position a on the left side and an average value b_ave of the relative lane marker lateral position b on the right side for every past T seconds.

Further, the travel_ECU 14 calculates a difference $\Delta x$ (a_ave−b_ave) between the average values of the left and right relative lane marker lateral positions for every past T seconds. In this way, the travel_ECU 14 determines a movement direction of the oncoming moving body O in a road width direction for every past T seconds. That is, the travel_ECU 14 determines that the movement direction of the host vehicle M is to the left side when the difference $\Delta x$ between the average values is a negative value, for example. On the other hand, the travel_ECU 14 determines that the movement direction of the host vehicle M is to the right side when the difference $\Delta x$ between the average values is a positive value, for example.

Then, the travel_ECU 14 determines that the host vehicle M is moving in the determined direction described above when the absolute value $|\Delta x|$ (|a_ave−b_ave|) of the difference between the average values is greater than a threshold value $\Delta x$th set in advance. On the other hand, the travel_ECU 14 determines that the host vehicle M is not moving in the road width direction when the absolute value $|\Delta x|$ (|a_ave−a_ave|) of the difference between the average values is less than the threshold value $\Delta x$th set in advance.

In this way, the travel_ECU 14 sequentially recognizes the movement direction during the period that the host vehicle M moved from the past 3T seconds to the past 2T seconds (timing t−2), the movement direction during the period that the host vehicle M moved from the past 2T seconds to the past T seconds (timing t−1), and the movement direction during the period that the host vehicle M moved from the past T seconds to the present moment (timing t).

Figure 7:
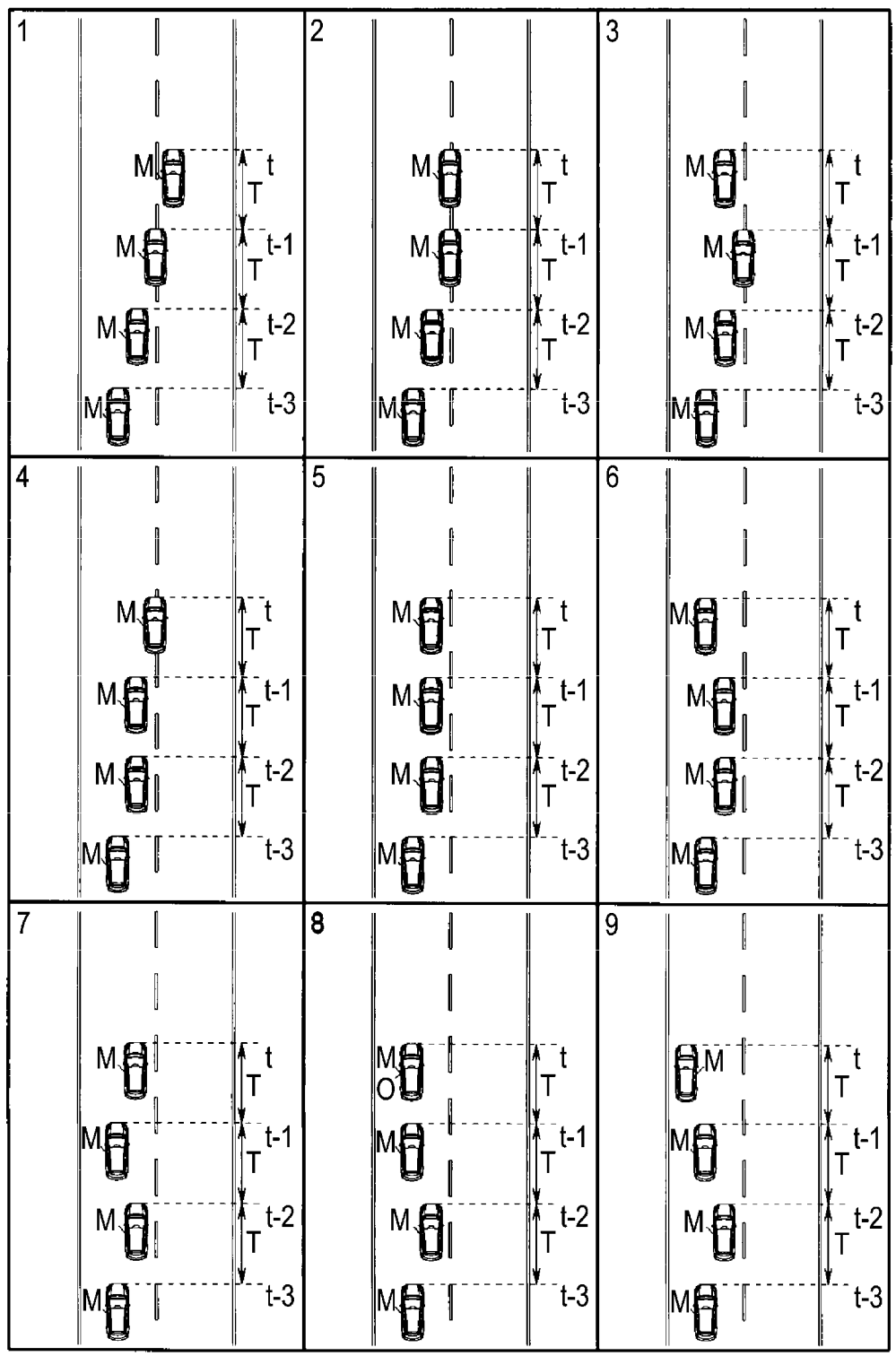
FIG. 7 is an explanatory view illustrating a behavior pattern of the host vehicle.
Figure 8:
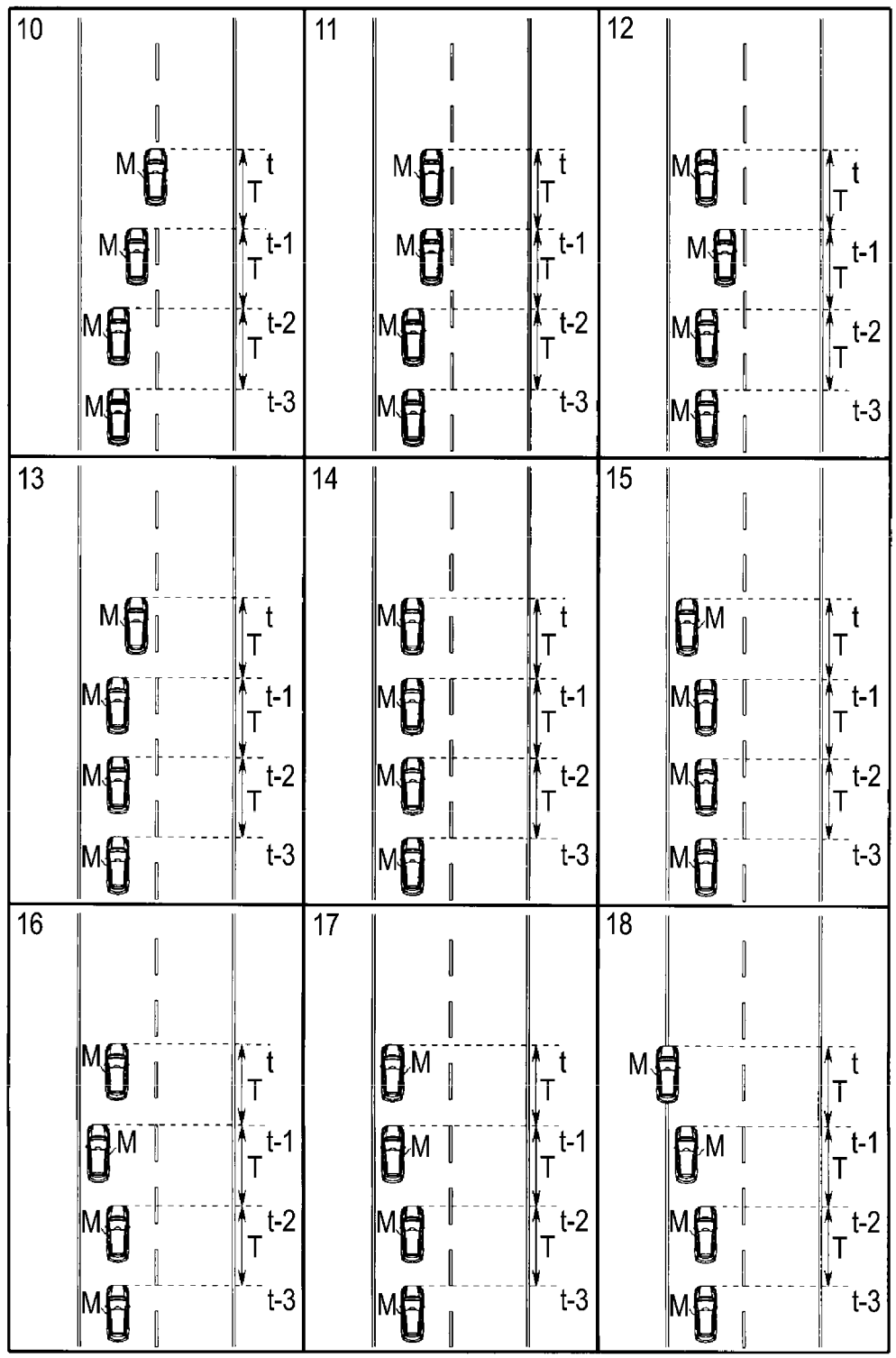
FIG. 8 is an explanatory view illustrating a behavior pattern of the host vehicle.
Figure 9:
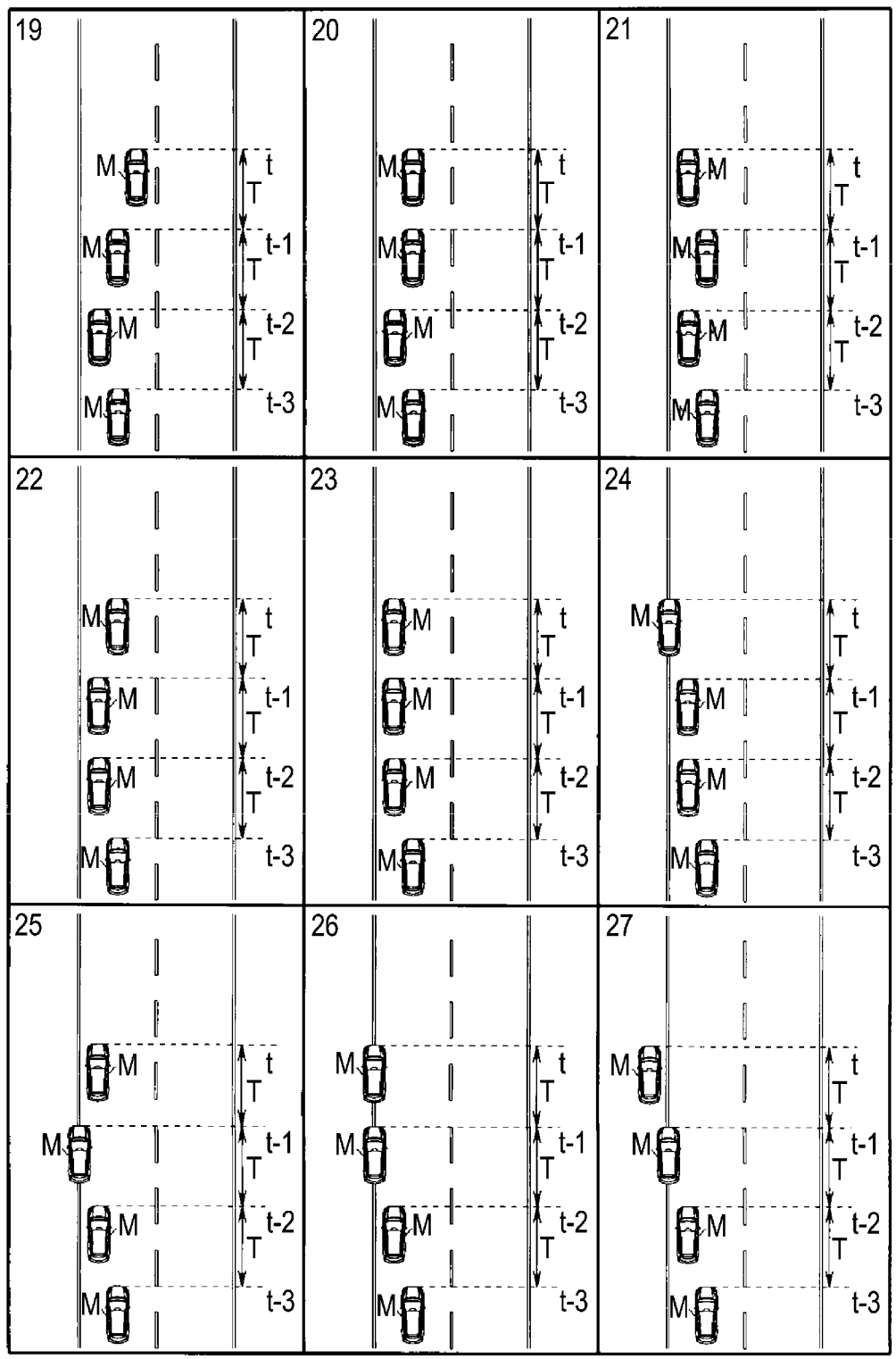
FIG. 9 is an explanatory view illustrating a behavior pattern of the host vehicle.

The combinations of the behaviors of the host vehicle M at timing t−2, timing t−1, and timing t are classified as any of the 27 patterns illustrated in FIG. 7 to FIG. 9, for example. The travel_ECU 14 calculates the risk degree intermediate values Rt−2, Rt−1, Rt at each timing on the basis of the classified pattern of behavior of the host vehicle M. These risk degree intermediate values Rt−2, Rt−1, Rt can be calculated with reference to the map illustrated in FIG. 9, for example. Then, the travel_ECU 14 calculates a final risk degree R for the host vehicle M by adding the calculated risk degree intermediate values Rt−2, Rt−1, Rt.

Then, the travel_ECU 14 transmits, via the transceiver 38, the calculated risk degree R of the host vehicle M along with information such as the position (latitude, longitude, altitude, and the like) of the host vehicle M on the road map, the vehicle velocity V of the host vehicle M, and the movement direction of the host vehicle M to the moving bodies such as other vehicles present around the host vehicle M.

In this manner, in the present embodiment, the travel_ECU 14 can transmit and receive information such as the risk degree R to and from other vehicles and the like.

Figure 5:
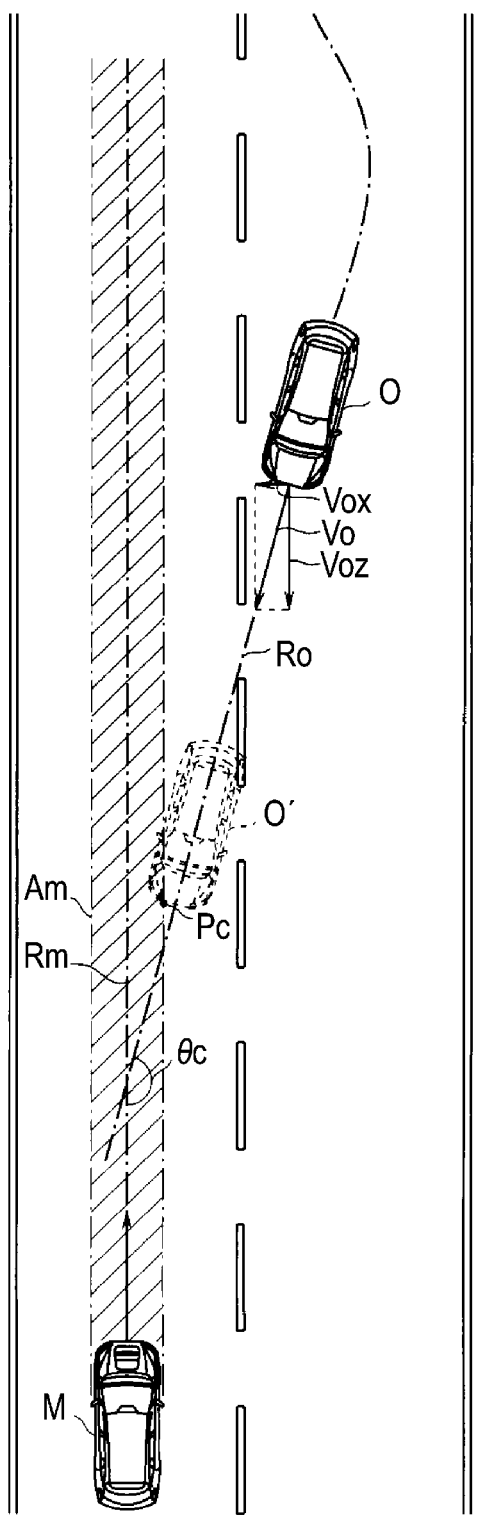
FIG. 5 is an explanatory view illustrating an oncoming moving body present in an oncoming lane.

To execute the preliminary collision avoidance control, the travel_ECU 14 determines, on the basis of the traveling environment information, whether a median strip that divides the road into the traveling lane of the host vehicle M and the oncoming lane is present on the road. Then, when a median strip is not present on the road traveled by the host vehicle M, the travel_ECU 14 detects the oncoming moving body O moving in the oncoming lane, for example (refer to FIG. 5). The detection of the oncoming moving body O is performed on the basis of reception information from various moving bodies such as other vehicles. That is, the travel_ECU 14 extracts the moving bodies present in the oncoming lane on the basis of positional information of the various moving bodies such as other vehicles on the road map. Then, the travel_ECU 14 detects the moving body that has a velocity component in a direction opposite to the movement direction of the host vehicle M and is moving in the oncoming lane as the oncoming moving body O. Note that, in the detection of the oncoming moving body O, travel_ECU 14 can use the traveling environment information recognized in the image recognition_ECU 13 in combination.

Upon detection of the oncoming moving body O, the travel_ECU 14 calculates, on the basis of a movement velocity (hereinafter referred to as velocity Vo) of the oncoming moving body O, a longitudinal velocity component Voz and a lateral velocity component Vox corresponding to the front-rear direction and the vehicle width direction of the host vehicle M.

Further, the travel_ECU 14 calculates, as predicted collision times for the oncoming moving body O, the time-to-collision (longitudinal time-to-collision) TTCz in the front-rear direction of the host vehicle M and a time-to-collision (lateral time-to-collision) TTCx in the vehicle width direction of the host vehicle M.

That is, for example, the travel_ECU 14 calculates the longitudinal time-to-collision TTCz by dividing a relative velocity in the longitudinal direction calculated from the vehicle velocity V of the host vehicle M and the longitudinal velocity component Voz of the oncoming moving body O by a relative distance between the host vehicle M and the oncoming moving body O in the longitudinal direction.

Further, the travel_ECU 14 calculates the lateral time-to-collision TTCx by, for example, dividing the lateral velocity component Vox of the oncoming moving body O by a distance from the oncoming moving body O to the target traveling region Am. In the calculation of this lateral time-to-collision TTCx, in some embodiments, the distance from the oncoming moving body O to the target traveling region Am is corrected on the basis of a width of the oncoming moving body O and an entry angle (predicted collision angle) of the oncoming moving body O with respect to the target traveling region Am.

Furthermore, on the basis of the risk degree R received from the oncoming moving body O, the travel_ECU 14 determines whether the oncoming moving body O is an obstacle that may collide with the host vehicle M. Then, upon recognizing the oncoming moving body O as an obstacle, the travel_ECU 14 executes, as appropriate, preliminary collision avoidance control prior to emergency collision avoidance control in response to the oncoming moving body O.

Here, in the present embodiment, the configuration of the driving assist device 1 mounted on the oncoming moving body O is similar to the configuration of the driving assist device 1 mounted on the host vehicle M. Accordingly, the description of the configuration of the driving assist device 1 mounted on the oncoming moving body O will be omitted. Note that, in the following description, in a case where there is a need to distinguish between the driving assist device 1 and each component of the driving assist device 1 related to the host vehicle M and the driving assist device 1 and each component of the driving assist device 1 related to the oncoming moving body O, "m" or "o" will be added at the end of the reference sign, as appropriate.

In one embodiment, the travel_ECU 14 may serve as an "emergency collision avoidance controller," a "risk determination region setting unit," a "risk degree calculator," and a "preliminary collision avoidance controller." Further, the transceiver 38 may serve as a "transmitter" and a "receiver." In one example, in a case where the preliminary collision avoidance control performed by the host vehicle M is considered as a reference, the travel_ECU 14*m* may serve as an "emergency collision avoidance controller," and a "preliminary collision avoidance controller." Further, the transceiver 38*m* may serve as a "receiver." On the other hand, the travel_ECU 14*o* may serve as a "lateral position calculator" and a "risk degree calculator." Further, the transceiver 38*o* may serve as a "transmitter."

Figure 11:
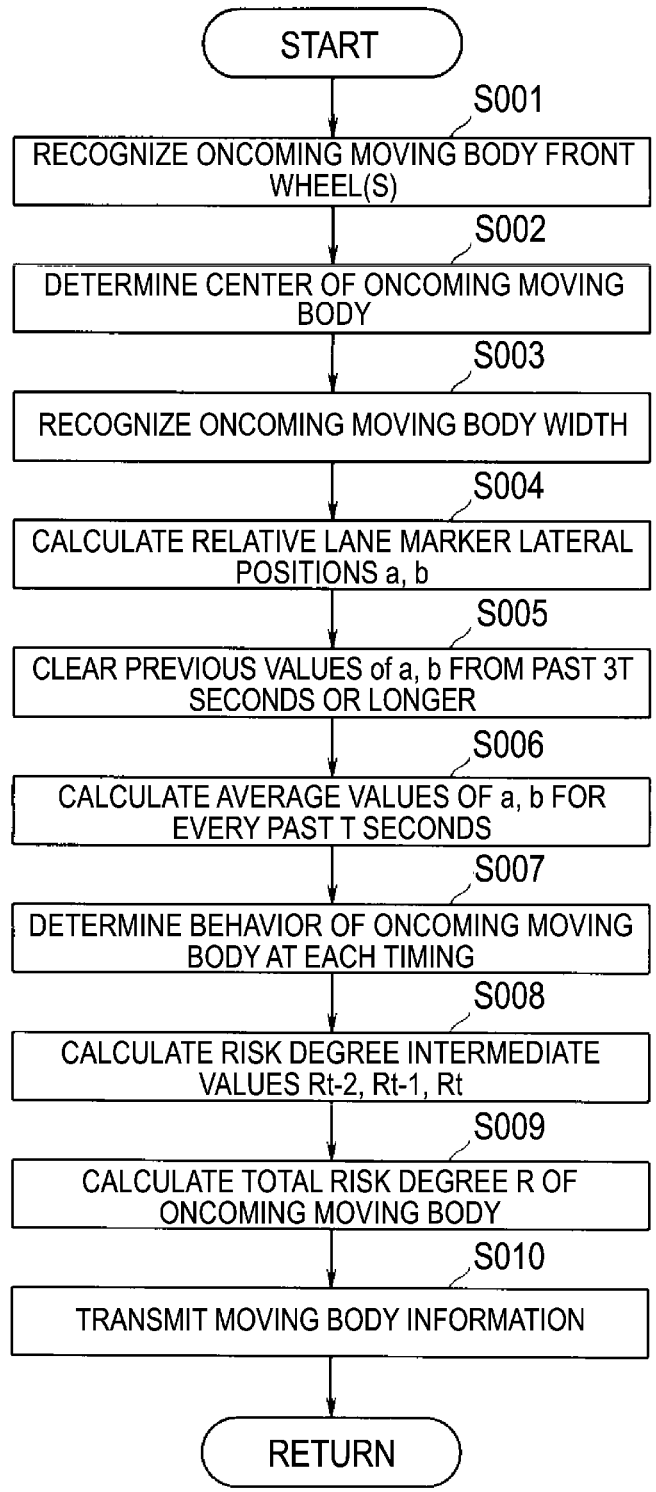
FIG. 11 is a flowchart illustrating a risk degree calculation routine.

Next, prior to a detailed description of the preliminary collision avoidance control, the calculation of the risk degree R performed in the other vehicles and the like will be described following the flowchart of a risk degree calculation routine illustrated in FIG. 11. Note that the calculation of the risk degree R is performed in various types of moving bodies equipped with the driving assist device 1, but the calculation of the risk degree R of the oncoming moving body O based on the travel_ECU 14*o* will be described herein.

When the routine starts, the travel_ECU 14*o*, in step S001, recognizes the front wheel(s) of the oncoming moving body O in a case where the oncoming moving body O is a four-wheeled vehicle, a two-wheeled vehicle, or the like.

In a subsequent step S002, the travel_ECU 14*o* determines the center of the oncoming moving body O. That is, for example, in a case where the oncoming moving body O is a four-wheeled vehicle, the travel_ECU 14*o* determines a center of treads of the front wheels recognized in step S001 as the center of the oncoming moving body O. Further, for example, when the oncoming moving body O is a two-wheeled vehicle, the travel_ECU 14*o* determines the position of the front wheel recognized in step S001 as the center of the oncoming moving body O.

In a subsequent step S003, the travel_ECU 14*o* recognizes the width of the oncoming moving body O.

In a subsequent step S004, the travel_ECU 14*o* calculates the distances from the left and right lane markers defining the oncoming lane to the lateral ends of the oncoming moving body O as the relative lane marker lateral positions a, b. Then, the travel_ECU 14*o* stores, as a movement history of the oncoming moving body O, the calculated relative lane marker lateral positions a, b.

In a subsequent step S005, the travel_ECU 14*o* clears, among the stored relative lane marker lateral positions a, b, the relative lane marker lateral positions a, b prior to the past 3T seconds.

In a subsequent step S006, the travel_ECU 14*o* reads the movement history of the oncoming moving body O for the past 3T seconds, and calculates the average values a_ave, b_ave of the left and right relative lane marker lateral positions a, b for every past T seconds.

In a subsequent step S007, the travel_ECU 14*o* determines the behavior of the oncoming moving body O at each timing t−2, t−1, t on the basis of the average values a_ave, b_ave of the left and right relative lane marker lateral positions a, b for every past T seconds. That is, the travel_ECU 14*o* calculates the difference Δx between the average values a_ave, b_ave for every interval of the past T seconds, and recognizes the behavior of the oncoming moving body O at each timing t−2, t−1, t, on the basis of the positive/negative value and absolute value of this difference Δx.

In a subsequent step S008, the travel_ECU 14*o* sequentially calculates the risk degree intermediate values Rt−2, Rt−1, Rt for the oncoming moving body O at each timing t−2, t−1, and t with reference to a map or the like set in advance.

Then, in step S009, the travel_ECU 14*o* calculates the value obtained by adding the calculated risk degree intermediate values Rt−2, Rt−1, Rt as the current risk degree R for the oncoming moving body O.

In a subsequent step S010, the travel_ECU 14*o* transmits, via the transceiver 38, information (moving body information) such as the calculated risk degree R, the position (latitude, longitude, altitude, and the like) of the oncoming moving body O, the velocity Vo of the oncoming moving body O, and the movement direction of the oncoming moving body O to the surrounding area.

Details of the preliminary collision avoidance control for the host vehicle M will now be described following the flowchart of a preliminary collision avoidance control routine illustrated in FIG. 12. This preliminary collision avoidance control routine is executed repeatedly for every set time in the travel_ECU 14 *m* when the host vehicle M is traveling on a road without a median strip present.

When the routine starts, in step S101, the travel_ECU 14 *m* receives, via the transceiver 38*m*, the moving body information transmitted from the various surrounding moving bodies. Then, the travel_ECU 14 *m* detects the oncoming moving bodies O present around the host vehicle M on the basis of the moving body information received from each of the moving bodies.

In a subsequent step S102, the travel_ECU 14 *m* checks whether the oncoming moving bodies O are in the oncoming lane.

Then, in step S102, in a case where the travel_ECU 14 *m* determines that the oncoming moving bodies O are not present in the oncoming lane (step S102: NO), the travel_ECU 14 *m* exits the routine.

On the other hand, in step S102, in a case where the travel_ECU 14 *m* determines that the oncoming moving body O is present in the oncoming lane (step S102: YES), the travel_ECU 14 *m* proceeds to step S103.

In step S103, the travel_ECU 14 *m* calculates the longitudinal time-to-collision TTCz and the lateral time-to-collision TTCx for the oncoming moving body O.

Upon proceeding from step S103 to step S104, the travel_ECU 14 *m* performs upper limit processing on the risk degree R. This upper limit processing is processing for preventing the risk degree R from becoming unnecessarily large due to a factor other than the wandering of the oncoming moving body O.

In this upper limit processing, the travel_ECU 14*m*, in a case where the risk degree R is expected to increase due to a factor other than the wandering of the oncoming moving body O, limits the risk degree R to, for example, "4" or less.

Figure 13:
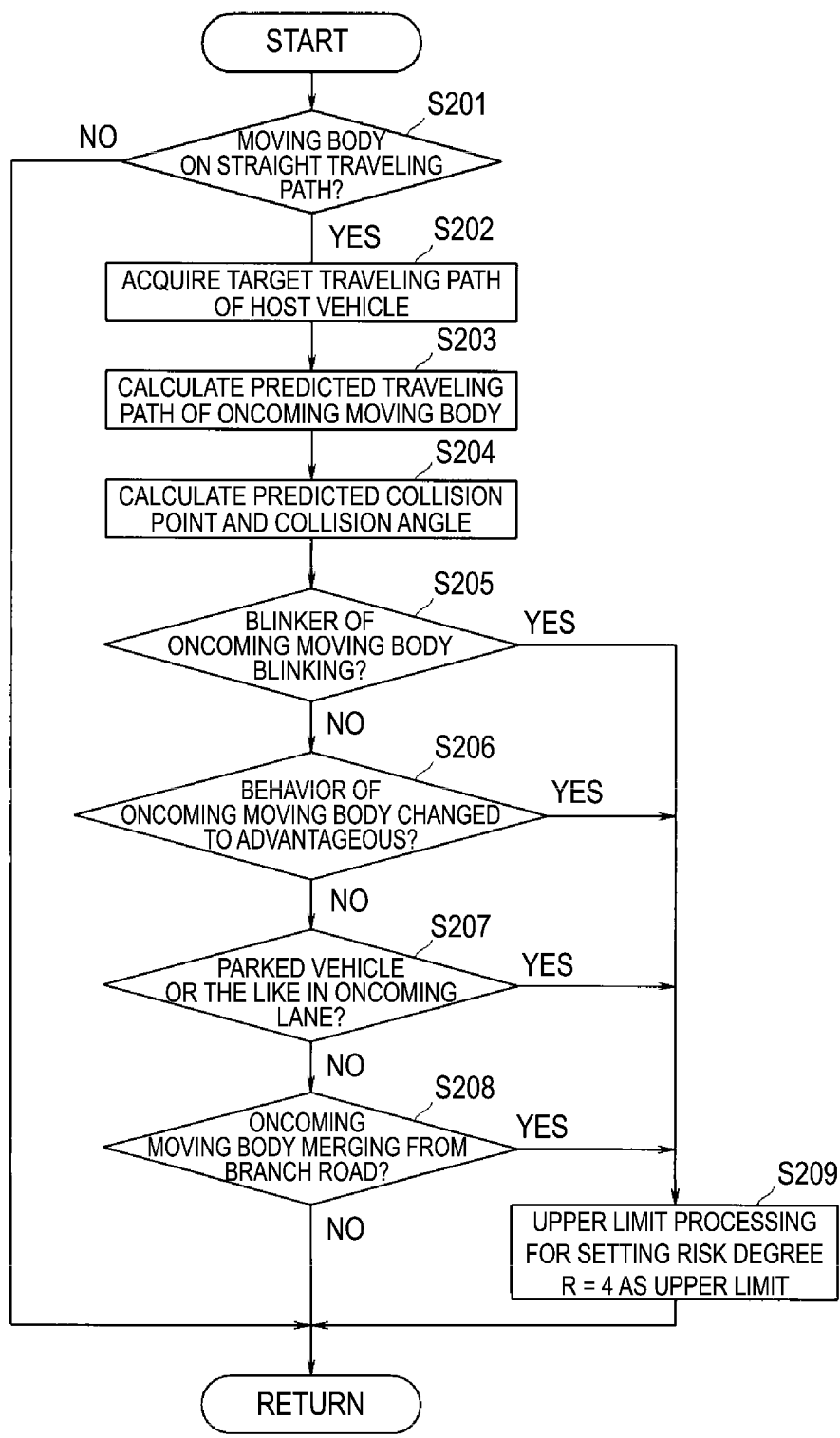
FIG. 13 is a flowchart illustrating a risk degree upper limit processing subroutine.

The upper limit processing for this risk degree R is executed according to the flowchart of a risk degree upper limit processing subroutine illustrated in FIG. 13, for example.

When the subroutine starts, the travel_ECU 14*m*, in step S201, checks whether the oncoming moving body O is moving on a straight traveling path with good visibility.

Then, in step S201, in a case where the travel_ECU 14 *m* determines that the oncoming moving body O is not moving on a straight traveling path (step S201: NO), the travel_ECU 14 *m* exits the subroutine.

On the other hand, in step S201, in a case where the travel_ECU 14 *m* determines that the oncoming moving body O is moving on a straight traveling path (step S201: YES), the travel_ECU 14 *m* proceeds to step S202.

In step S202, the travel_ECU 14 *m* acquires the target traveling path Rm set for the host vehicle M.

In a subsequent step S203, the travel_ECU 14 *m* calculates the predicted traveling path Ro of the oncoming moving body O on the basis of the current velocity and movement direction of the oncoming moving body O.

In a subsequent step S204, the travel_ECU 14 *m* calculates a predicted collision point Pc and a collision angle θc of the host vehicle M and the oncoming moving body O. For example, in a case where it is presumed that the oncoming moving body O moved on the predicted traveling path Ro (refer to O' in FIG. 5), the travel_ECU 14 *m* calculates, as the predicted collision point Pc of the host vehicle M and the oncoming moving body O, a point at which the longitudinal time-to-collision TTCz and the lateral time-to-collision TTCx are both "0" or less (refer to FIG. 5), for example. Further, in a case where it is presumed that the oncoming moving body O moved to the predicted collision point Pc, the travel_ECU 14 *m* calculates the collision angle θc on the basis of a relative angle between the oncoming moving body O' after moving and the host vehicle M.

In a subsequent step S205, the travel_ECU 14 *m* checks whether a blinker of the oncoming moving body O is blinking.

Then, in step S205, in a case where the travel_ECU 14 *m* determines that a blinker of the oncoming moving body O is blinking (step S205: YES), the travel_ECU 14 *m* proceeds to step S209.

In step S209, for example, the travel_ECU 14 *m* performs upper limit processing in which the risk degree R is set to "4" or less, and subsequently exits the subroutine.

Figure 16:
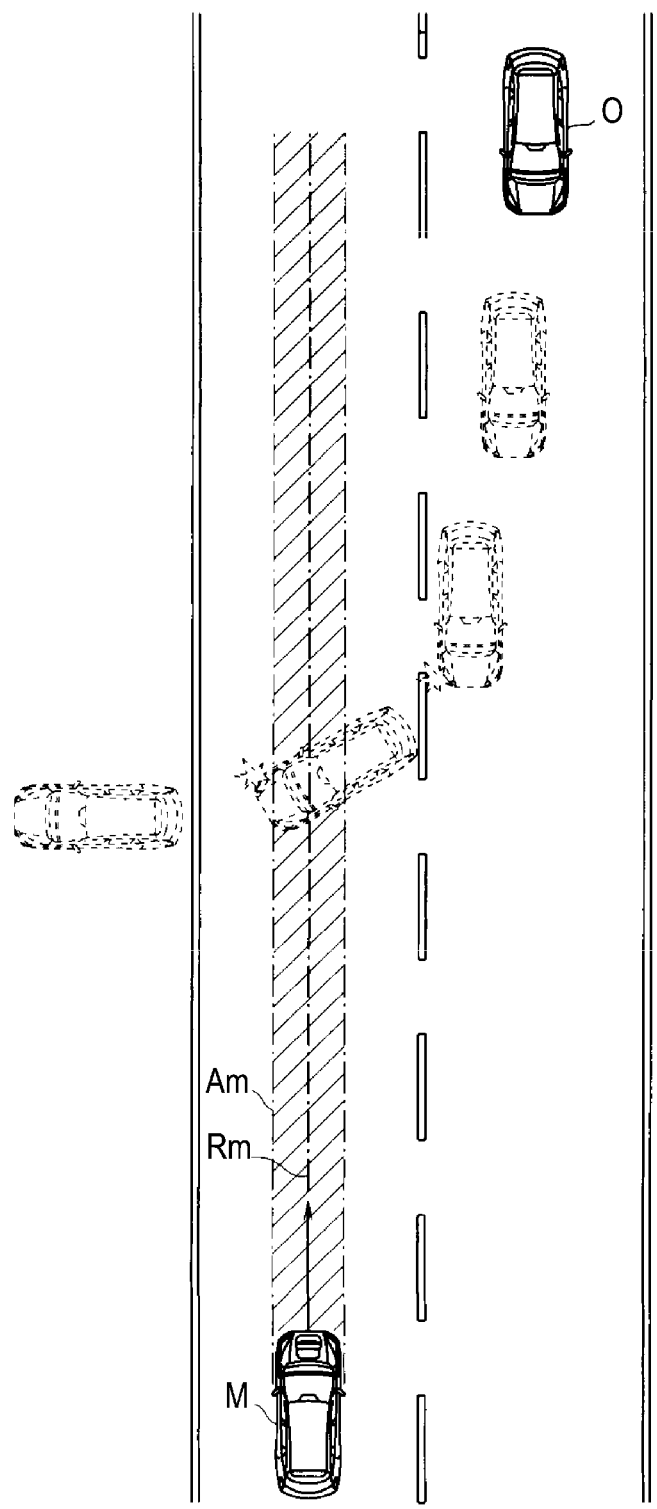
FIG. 16 is an explanatory view illustrating a case where the risk degree of the oncoming moving body increases due to a factor other than wandering.

That is, for example, as illustrated in FIG. 16, as a case where the risk degree R of the oncoming moving body O increases due to a factor other than wandering, a case is expected where the oncoming moving body O turns toward the traveling lane of the host vehicle M while the blinker is blinking. In such a case, the intention of the driver driving the oncoming moving body O is clear, and it is expected that the driver is sufficiently aware of the host vehicle M. Accordingly, in such a case, it is hard to imagine sudden entry of the oncoming moving body O into the traveling lane of the host vehicle M at the timing at which collision with the host vehicle M is highly likely, and thus the control content is restricted by upper limit processing.

On the other hand, in step S205, in a case where the travel_ECU 14 *m* determines that the blinker of the oncoming moving body O is not blinking (step S205: NO), the travel_ECU 14 *m* proceeds to step S206.

In step S206, the travel_ECU 14 *m* checks whether, compared with before, the behavior of the oncoming moving body O is changing into an advantageous situation in which collision with the host vehicle M is avoidable. That is, the travel_ECU 14 *m* checks whether the predicted traveling path Ro of the oncoming moving body O calculated in step S203 and the predicted collision point Pc and the collision angle θc of the oncoming moving body O calculated in step S204 are changing into an advantageous situation. Here, for example, in a case where the lateral velocity component Vox of the oncoming moving body O starts to decline, in general, the predicted traveling path Ro of the oncoming moving body O is angled toward the host vehicle M. Further, for example, in a case where the lateral velocity component Vox of the oncoming moving body O starts to decline, the predicted collision point Pc of the oncoming moving body O moves to the host vehicle M. Further, for example, in a case where the lateral velocity component Vox of the oncoming moving body O starts to decline, the collision angle θc changes so as to increase. Thus, in a case where at least one of the predicted traveling path Ro being angled toward the host vehicle M, the predicted collision point Pc having moved to the host vehicle M, or the collision angle θc having changed so as to increase is established, the travel_ECU 14 *m* determines that the behavior of the oncoming moving body O has changed to advantageous.

Then, in a case where the travel_ECU 14 *m* determines that the behavior of the oncoming moving body O has changed to advantageous (step S206: YES), the travel_ECU 14 *m* proceeds to step S209.

Upon proceeding to step S209, the travel_ECU 14 *m* performs upper limit processing in which the risk degree R is set to "4" or less, for example, and subsequently exits the subroutine.

On the other hand, in step S206, in a case where the travel_ECU 14 *m* determines that the behavior of the oncoming moving body O has changed to disadvantageous (step S206: NO), the travel_ECU 14 *m* proceeds to step S207.

In step S207, the travel_ECU 14 *m* checks whether a stationary object such as a parked vehicle is present near the oncoming moving body O in the oncoming lane.

In step S207, in a case where the travel_ECU 14 *m* determines that a parked vehicle or the like is present in the oncoming lane (step S207: YES), the travel_ECU 14 *m* proceeds to step S209.

Upon proceeding to step S209, the travel_ECU 14 *m* performs upper limit processing in which the risk degree R is set to "4" or less, for example, and subsequently exits the subroutine.

Figure 17:
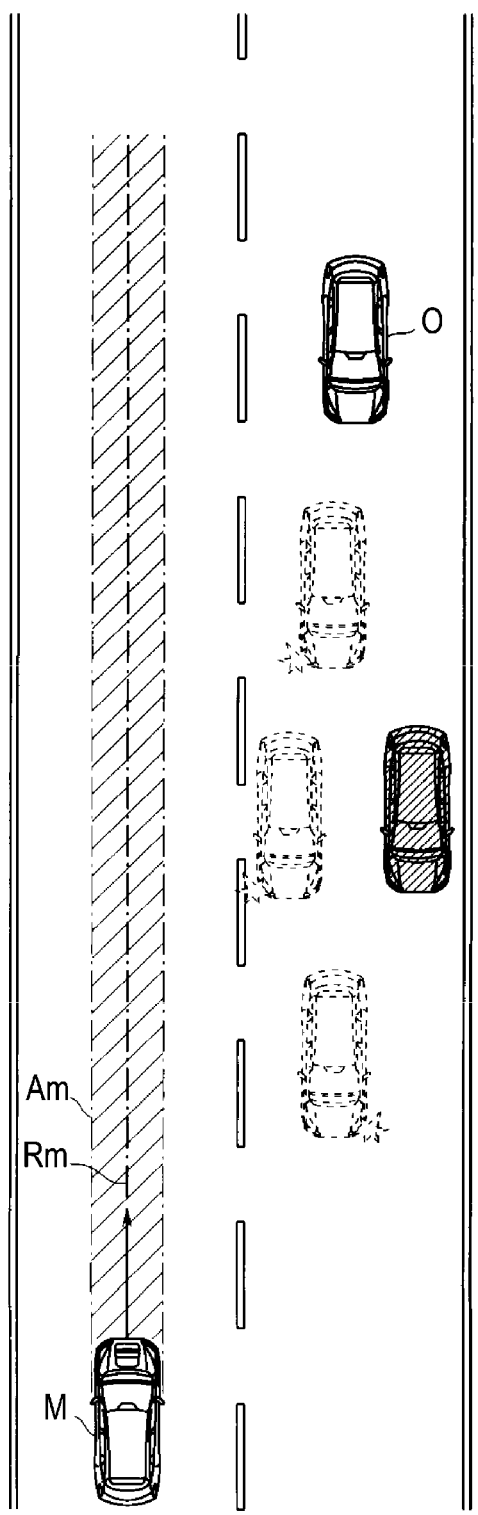
FIG. 17 is an explanatory view illustrating a case where the risk degree of the oncoming moving body increases due to a factor other than wandering.

That is, as illustrated in FIG. 17, for example, as a case where the risk degree R of the oncoming moving body O increases due to a factor other than wandering, a case is expected where the oncoming moving body O avoids a stationary object such as a parked vehicle in the oncoming lane. In such a case, the intention of the driver driving the oncoming moving body O is clear, and it is expected that the driver is sufficiently aware of the host vehicle M. In addition, in such a case, it is expected that the risk degree R calculated on the basis of the risk determination region temporarily increases and subsequently starts to decrease quickly. Accordingly, in such a case, it is hard to imagine sudden entry of the oncoming moving body O into the traveling lane of the host vehicle M at the timing at which collision with the host vehicle M is highly likely, and thus the control content is restricted by upper limit processing.

On the other hand, in step S207, in a case where the travel_ECU 14 *m* determines that a parked vehicle or the like is not present in the oncoming lane (step S207: NO), the travel_ECU 14 *m* proceeds to step S208.

In step S208, the travel_ECU 14 *m* checks whether the oncoming moving body O is merging from a branch road into the oncoming lane.

Then, in step S208, in a case where the travel_ECU 14 *m* determines that the oncoming moving body O is merging from a branch road (step S208: YES), the travel_ECU 14 *m* proceeds to step S209.

Upon proceeding to step S209, the travel_ECU 14 *m* performs upper limit processing in which the risk degree R is set to "4" or less, for example, and subsequently exits the subroutine.

Figure 18:
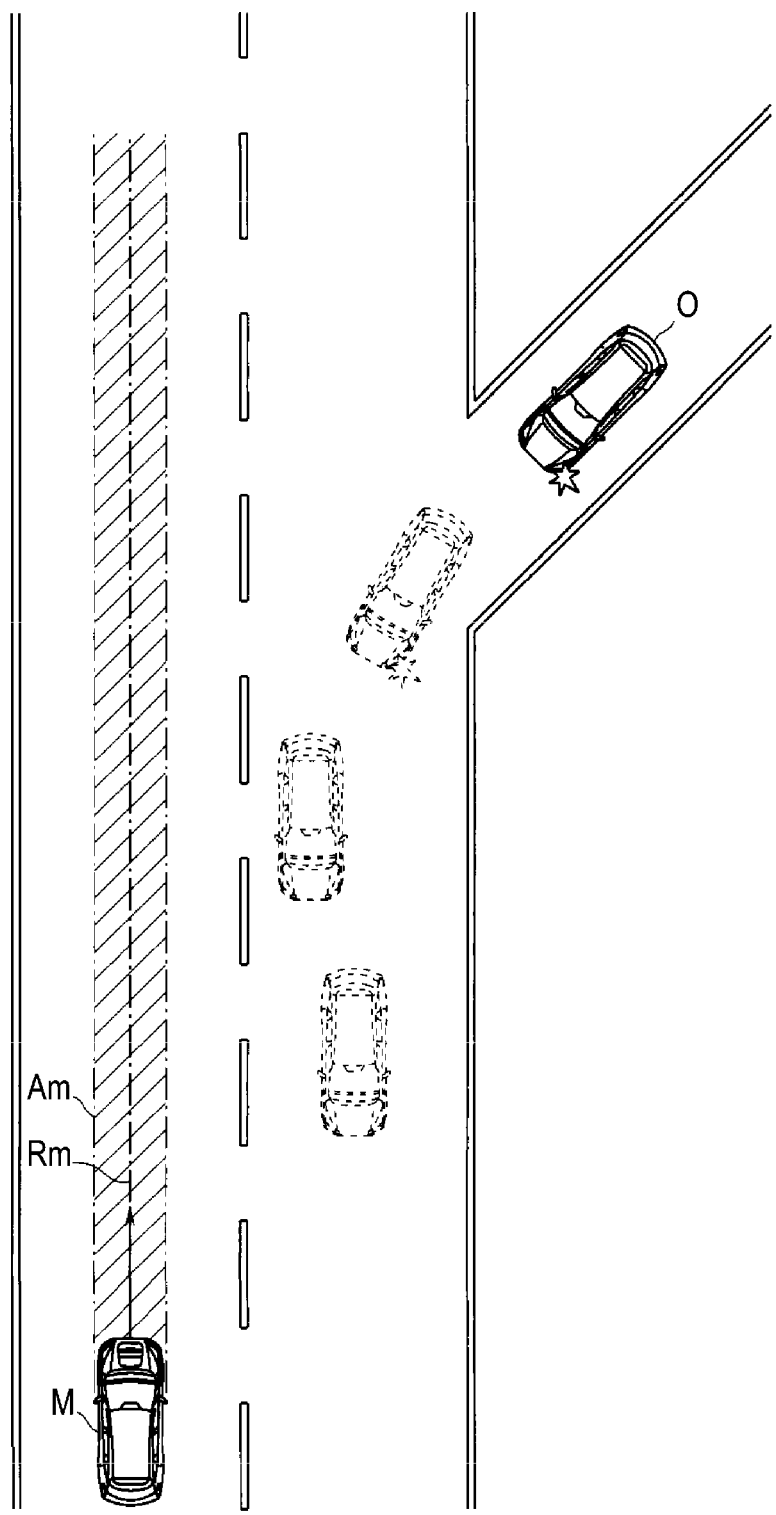
FIG. 18 is an explanatory view illustrating a case where the risk degree of the oncoming moving body increases due to a factor other than wandering.

That is, for example, as illustrated in FIG. 18, as a case where the risk degree R of the oncoming moving body O increases due to a factor other than wandering, a case is expected where the oncoming moving body O enters the oncoming lane from a branch road or the like. In such a case, the intention of the driver driving the oncoming moving body O is clear, and it is expected that the driver is sufficiently aware of the host vehicle M. In addition, in such a case, it is expected that the risk degree R calculated on the basis of the risk determination region temporarily increases and subsequently starts to decrease quickly. Accordingly, in such a case, it is hard to imagine sudden entry of the oncoming moving body O into the traveling lane of the host vehicle M at the timing of collision with the host vehicle M, and thus the control content is restricted by upper limit processing.

On the other hand, in step S208, in a case where the travel_ECU 14 *m* determines that the oncoming moving body O is not merging from a branch road (step S208: NO), the travel_ECU 14 *m* exits the subroutine.

Figure 12:
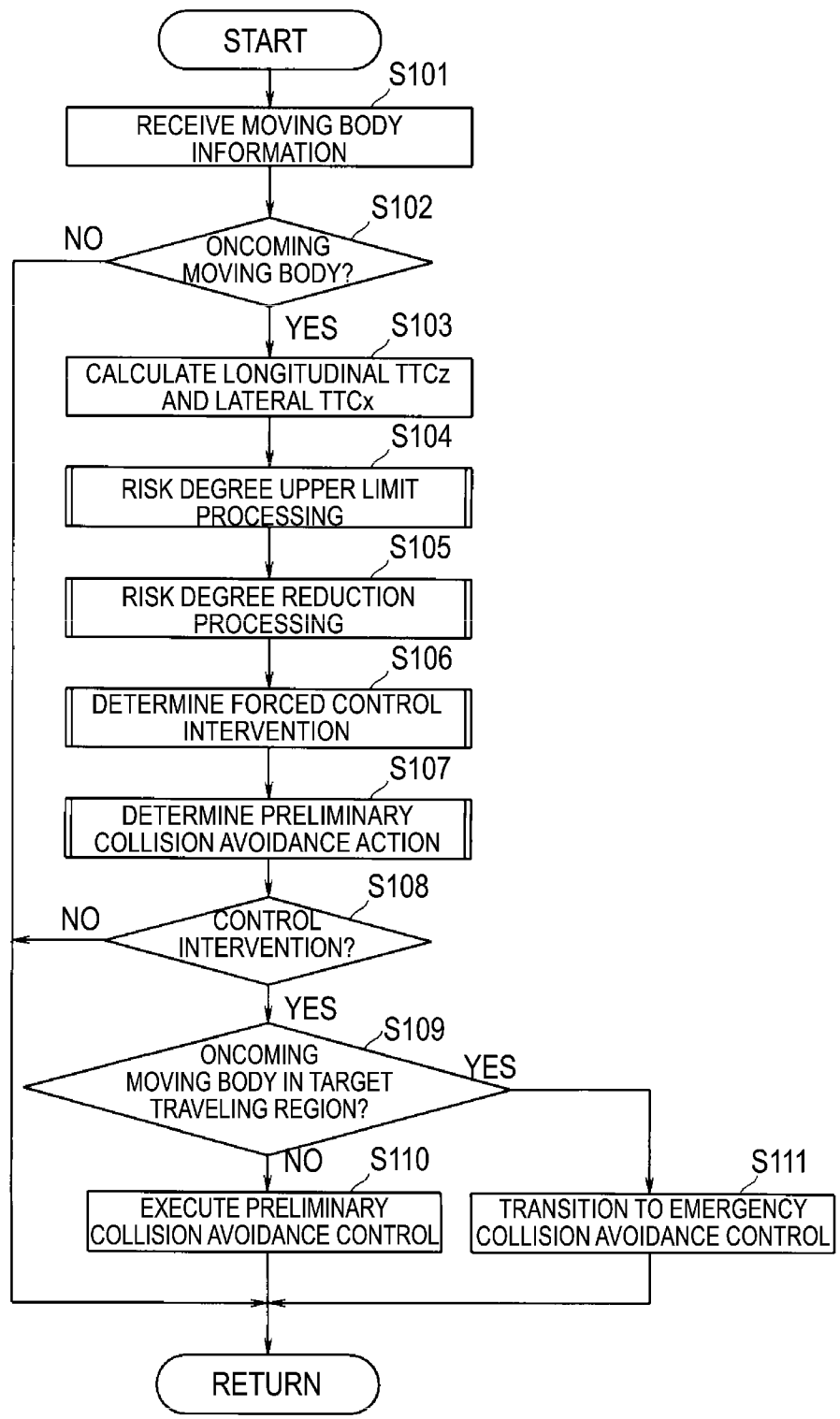
FIG. 12 is a flowchart illustrating a preliminary collision avoidance control routine.

In the main routine in FIG. 12, upon proceeding from step S104 to step S105, the travel_ECU 14 *m* performs reduction processing on the risk degree R. This reduction processing is processing for reducing, as appropriate, a risk level LV of preliminary collision avoidance control (described below) permitted in accordance with the risk degree R. This risk level LV is reduced on the basis of a relative relationship between the host vehicle M and the oncoming moving body O. For example, even in a case where the wandering of the oncoming moving body O is significant and the risk degree R of the oncoming moving body O entering the traveling lane of the host vehicle M is high, when the oncoming moving body O is far away, the likelihood of the host vehicle M colliding with the oncoming moving body O is low. Therefore, in such a case, the travel_ECU 14 *m* reduces the risk level LV of the preliminary collision avoidance control permitted in accordance with the risk degree R to prevent excessive preliminary collision avoidance control from being executed.

Figure 14:
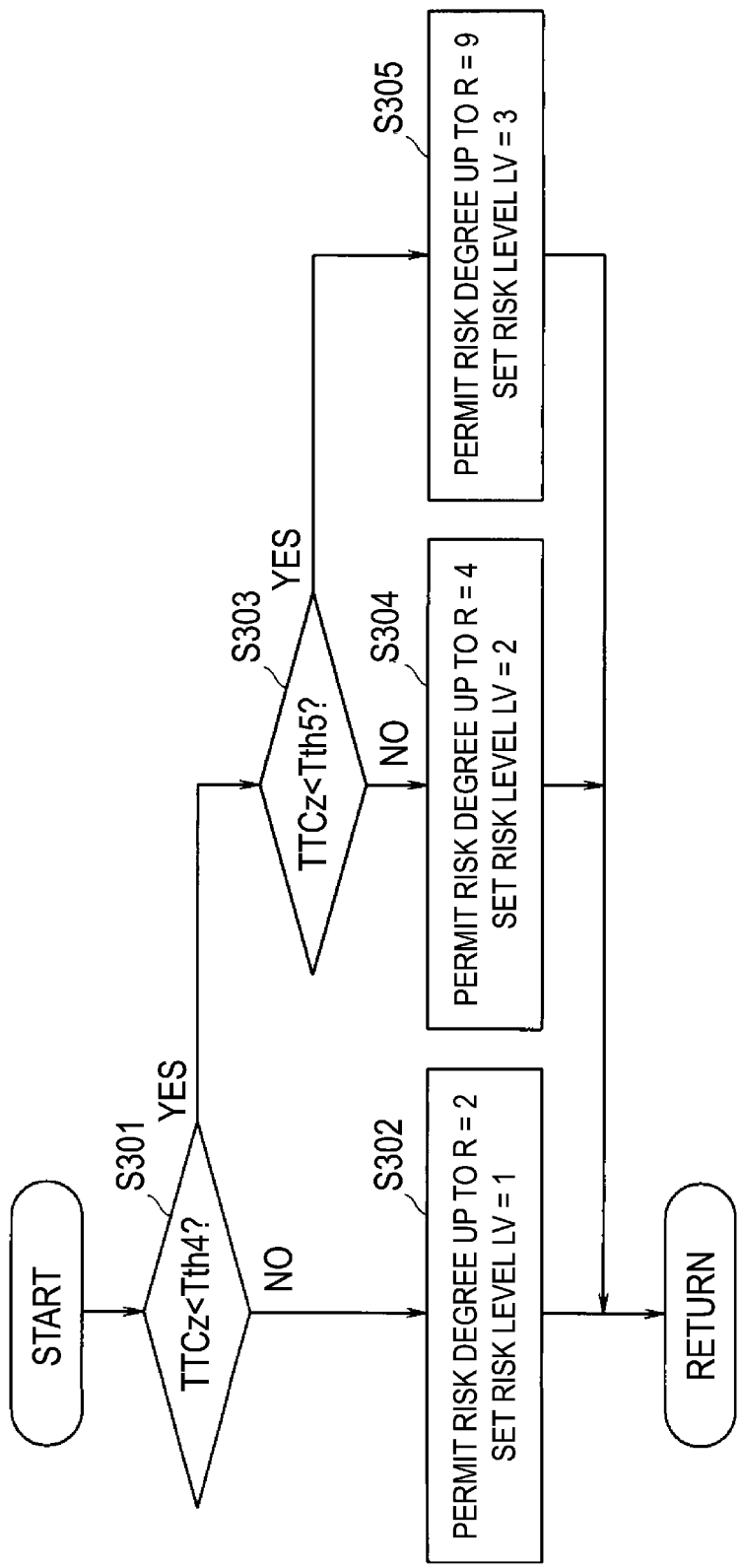
FIG. 14 is a flowchart illustrating a risk degree reduction processing subroutine.

This reduction processing is executed according to the flowchart of a reduction processing subroutine illustrated in FIG. 14, for example.

When the subroutine starts, in step S301, the travel_ECU 14 *m* checks whether the longitudinal time-to-collision TTCz for the oncoming moving body O is less than a fourth threshold value Tth4 (where, Tth1<Tth4) set in advance.

Then, in step S301, in a case where the travel_ECU 14 *m* determines that the longitudinal time-to-collision TTCz is equal to or greater than the fourth threshold value Tth4 (step S301: NO), the travel_ECU 14 *m* proceeds to step S302.

In step S302, the travel_ECU 14 *m* permits preliminary collision avoidance control corresponding to when the risk degree R is "2" or less, and subsequently exits the subroutine. In this way, the travel_ECU 14 *m* permits control up to preliminary collision avoidance control corresponding to when the risk degree R is "2" even when the current risk degree R is "9," for example. Further, in a case where the current risk degree R is "2," for example, the travel_ECU 14 *m* permits the preliminary collision avoidance control corresponding to when the risk degree R is "2." Note that, in the present embodiment, preliminary collision avoidance control corresponding to when the risk degree R is "2" or less is collision avoidance control of the risk level LV=1 associated with the "caution region" of the risk determination region.

On the other hand, in step S301, in a case where the travel_ECU 14 *m* determines that the longitudinal time-to-collision TTCz is less than the fourth threshold value Tth4 (step S301: YES), the travel_ECU 14 *m* proceeds to step S303.

In step S303, the travel_ECU 14 *m* checks whether the longitudinal time-to-collision TTCz is less than a fifth threshold value Tth4 (where, Tth1<Tth5<Tth4) set in advance.

Then, in step S303, in a case where the travel_ECU 14 *m* determines that the longitudinal time-to-collision TTCz is equal to or greater than the fifth threshold value Tth5 (step S303: NO), the travel_ECU 14 *m* proceeds to step S304.

In step S304, the travel_ECU 14 *m* permits preliminary collision avoidance control corresponding to when the risk degree R is "4" or less, and subsequently exits the subroutine. In this way, the travel_ECU 14 *m* permits control up to the preliminary collision avoidance control corresponding to when the risk degree R is "4" even when the current risk degree R is "9," for example. Further, in a case where the current risk degree R is "4," for example, the travel_ECU 14 *m* permits preliminary collision avoidance control corresponding to when the risk degree R is "4." Note that, in the present embodiment, preliminary collision avoidance control corresponding to when the risk degree R is greater than "2" and "4" or less is collision avoidance control of the risk level LV=2 associated with the "warning region" of the risk determination region.

On the other hand, in step S303, in a case where the travel_ECU 14 *m* determines that the longitudinal time-to-collision TTCz is less than the fifth threshold value Tth5 (step S303: YES), the travel_ECU 14 *m* proceeds to step S305.

In step S305, the travel_ECU 14 *m* permits the preliminary collision avoidance control corresponding to when the risk degree R is "9" or less, and subsequently exits the subroutine. In this way, the travel_ECU 14 *m* permits the preliminary collision avoidance control corresponding to all risk degrees R, for example. That is, in a case where the current risk degree R is "9," for example, the travel_ECU 14 *m* permits the preliminary collision avoidance control corresponding to when the risk degree R is "9." Further, in a case where the current risk degree R is "4," for example, the travel_ECU 14 *m* permits the preliminary collision avoidance control corresponding to when the risk degree R is "4." Note that, in the present embodiment, the preliminary collision avoidance control corresponding to when the risk degree R is greater than "4" and "9" or less is the collision avoidance control of the risk level LV=3 associated with the "danger region" of the risk determination region.

In the main routine in FIG. 12, upon proceeding from step S105 to step S106, the travel_ECU 14 *m* performs a forced control intervention determination with respect to the oncoming moving body O. This forced control intervention is a determination for forcibly executing preliminary collision avoidance control for the risk level LV=3 in an emergency such as in a case where the oncoming moving body O continues to move directly in the direction of the host vehicle M, for example.

Figure 15:
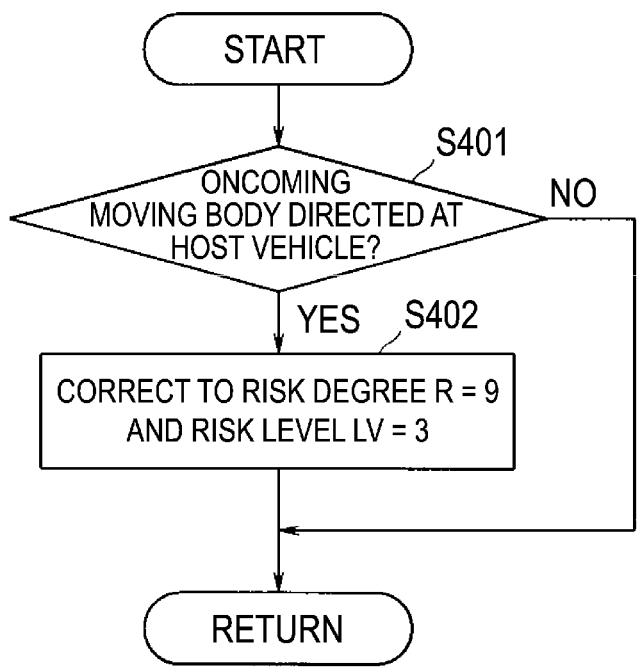
FIG. 15 is a flowchart illustrating a forced control intervention determination subroutine.

This forced control intervention determination is made according to a forced control intervention determination subroutine illustrated in FIG. 15, for example.

When the subroutine starts, in step S401, the travel_ECU 14 *m* checks whether the oncoming moving body O has continued to move directly in the direction of the host vehicle M for a set time (for example, a predetermined frame).

Then, in step S401, in a case where the travel_ECU 14 *m* determines that the oncoming moving body O is not moving directly in the direction of the host vehicle M (step S401: NO), the travel_ECU 14 *m* exits the subroutine.

On the other hand, in step S401, in a case where the travel_ECU 14 *m* determines that the oncoming moving body O is moving directly in the direction of the host vehicle M (step S401: YES), the travel_ECU 14 *m* proceeds to step S402.

In step S402, the travel_ECU 14 *m* corrects the risk degree R for the oncoming moving body O to "9" and corrects the risk level LV permitted for the oncoming moving body O to "3," for example, and subsequently exits the subroutine.

In the main routine in FIG. 12, upon proceeding from step S106 to step S107, the travel_ECU 14 *m* determines the kind of preliminary collision avoidance action to be taken in response to the oncoming moving body O. This preliminary collision avoidance action is determined on the basis of the risk level LV currently permitted for the oncoming moving body O and the current risk degree R currently set for the oncoming moving body O, for example.

Herein, for example, as illustrated in FIG. 19, in a case where the current risk degree R for the oncoming moving body O is "0," "0" is set as the risk level for the oncoming moving body O. When the risk level LV=0, the travel_ECU 14 *m* prohibits output of an alert or the like for notifying the driver of the presence of the oncoming moving body O. Further, when the risk level LV=0, the travel_ECU 14 *m* prohibits avoidance control in the longitudinal direction (front-rear direction of the host vehicle M) in response to the oncoming moving body O. Furthermore, when the risk level LV=0, the travel_ECU 14 *m* prohibits avoidance control in the lateral direction (vehicle width direction of the host vehicle M) in response to the oncoming moving body O.

Further, for example, as illustrated in FIG. 19, in a case where the risk degree R is greater than "0" and control up to the risk level LV=1 is permitted in response to the oncoming moving body O, the travel_ECU 14 *m* prohibits output of an alert or the like for notifying the driver of the presence of the oncoming moving body O.

Further, in a case where the risk degree R is greater than "0" and control up to the risk level LV=1 is permitted in response to the oncoming moving body O, the travel_ECU 14 *m* performs avoidance control in the longitudinal direction (front-rear direction of the host vehicle M) in response to the oncoming moving body O. In this avoidance control, the travel_ECU 14 *m* permits first acceleration suppression control, for example, in place of the braking control. In this first acceleration suppression control, a first acceleration suppression amount is set, as appropriate, only in a case where the host vehicle M is accelerating (including a case where the host vehicle M is about to accelerate), for example. The first acceleration suppression amount is set so as to increase as the longitudinal time-to-collision TTCz decreases, on the basis of a map or the like set in advance, for example.

Further, in a case where the risk degree R is greater than "0" and control up to the risk level LV=1 is permitted in response to the oncoming moving body O, the travel_ECU 14 *m* performs avoidance control in the lateral direction (vehicle width direction of the host vehicle M) in response to the oncoming moving body O. In this avoidance control, the travel_ECU 14 *m* permits steering control within a range in which there is no deviation from the traveling lane in which the host vehicle M is traveling, for example. In this steering control, an avoidance amount by steering is set as appropriate. The avoidance amount is set so as to increase as the lateral time-to-collision TTCx decreases, on the basis of a map or the like set in advance, for example. Note that, in some embodiments, the steering wheel steering speed permitted for this steering control is limited to about 10 deg/s, for example.

Further, for example, as illustrated in FIG. 19, in a case where the risk degree R is greater than "2" and control up to the risk level LV=2 is permitted in response to the oncoming moving body O, the travel_ECU 14 *m* sets an alert or the like for notifying the driver of the presence of the oncoming moving body O.

Further, in a case where the risk degree R is greater than "2" and control up to the risk level LV=2 is permitted in response to the oncoming moving body O, the travel_ECU 14 *m* performs avoidance control in the longitudinal direction in response to the oncoming moving body O. In this avoidance control, the travel_ECU 14 *m* permits second acceleration suppression control in place of braking control. In this second acceleration suppression control, a second acceleration suppression amount is set as appropriate only in a case where the host vehicle M is accelerating (including a case where the host vehicle M is about to accelerate), for example. The second acceleration suppression amount is set so as to increase as the longitudinal time-to-collision TTCz decreases, on the basis of a map or the like set in advance, for example. Note that the second acceleration suppression amount is set to be greater than the first acceleration suppression amount. For example, the deceleration (suppression amount) obtained when the driver releases the accelerator is provided as the upper limit for the second acceleration suppression amount.

Further, in a case where the risk degree R is greater than "2" and control up to the risk level LV=2 is permitted in response to the oncoming moving body O, the travel_ECU 14 *m* performs avoidance control in the lateral direction in response to the oncoming moving body O. In this avoidance control, the travel_ECU 14 *m* permits steering control to a position at which the host vehicle M straddles a lane marker, for example. In this steering control, the avoidance amount by steering is set as appropriate. The avoidance amount is set so as to increase as the lateral time-to-collision TTCx decreases, on the basis of a map or the like set in advance, for example. Note that, in some embodiments, the steering wheel steering speed permitted for this steering control is limited to about 80 deg/s, for example.

Further, for example, as illustrated in FIG. 19, in a case where the risk degree R is greater than "4" and control up to the risk level LV=3 is permitted in response to the oncoming moving body O, the travel_ECU 14 *m* sets an alert or the like for notifying the driver of the presence of the oncoming moving body O.

Further, in a case where the risk degree R is greater than "4" and control up to the risk level LV=3 is permitted in response to the oncoming moving body O, the travel_ECU 14 *m* performs avoidance control in the longitudinal direction in response to the oncoming moving body O. In this avoidance control, the travel_ECU 14 *m* permits braking control. In this braking control, for example, the braking amount is set as appropriate. The braking amount is set so as to increase as the time-to-collision TTCz decreases, on the basis of a map or the like set in advance. Note that this braking amount is, in one example, set with the first target deceleration a1 (0.4 G, for example) of the emergency collision avoidance control described above as the limit.

Further, in a case where the risk degree R is greater than "4" and control up to the risk level LV=3 is permitted in response to the oncoming moving body O, the travel_ECU 14 *m* performs avoidance control in the lateral direction in response to the oncoming moving body O. In this avoidance control, the travel_ECU 14 *m* permits steering control to a position at which the host vehicle M travels across a lane marker, for example. In this steering control, the avoidance amount by steering is set as appropriate, for example. The avoidance amount is set so as to increase as the lateral time-to-collision TTCx decreases, on the basis of a map or the like set in advance, for example. Note that, in some embodiments, the steering wheel steering speed permitted for this steering control is limited to about 240 deg/s, for example.

Upon proceeding from step S107 to step S108, the travel_ECU 14 *m* checks whether control intervention is used in response to the oncoming moving body O, that is, checks whether a predetermined control amount has been set in step S107 described above.

Then, in step S108, in a case where the travel_ECU 14 *m* determines that control intervention is not used (step S108: NO), the travel_ECU 14 *m* exits the routine.

On the other hand, in a case where the travel_ECU 14 *m* determines that the control intervention is used in step S108 (step S108: YES), the travel_ECU 14 *m* proceeds to step S109.

In step S109, the travel_ECU 14 *m* checks whether the oncoming moving body O has entered the target traveling region Am of the host vehicle M.

Then, in step S109, in a case where the travel_ECU 14 *m* determines that the oncoming moving body O is present outside the target traveling region Am of the host vehicle M (step S109: NO), the travel_ECU 14 *m* proceeds to step S110.

In step S110, the travel_ECU 14 *m* executes preliminary collision avoidance control, and subsequently exits the routine. That is, the travel_ECU 14 *m* executes preliminary collision avoidance control on the basis of the control amount set in step S107.

On the other hand, in step S109, in a case where the travel_ECU 14 *m* determines that the oncoming moving body O is present inside the target traveling region Am of the host vehicle M (step S109: YES), the travel_ECU 14 *m* proceeds to step S111.

In step S111, the travel_ECU 14 *m* transitions the control in response to the oncoming moving body O from preliminary collision avoidance control to emergency collision avoidance control, and then exits the routine.

According to such an embodiment, the travel_ECU 14*o* of the oncoming moving body O calculates the distances from the lane markers defining the oncoming lane to the lateral ends of the oncoming moving body O as the relative lane marker lateral positions a, b, every set cycle. Further, the travel_ECU 14o calculates the risk degree R for the oncoming moving body O on the basis of the history of the relative lane marker lateral positions calculated within the time period set in advance. Furthermore, the travel_ECU 14o transmits, via the transceiver 38o, the calculated risk degree R to the surrounding area. On the other hand, the travel_ECU 14 m of the host vehicle M receives, via the transceiver 38m, the risk degree R transmitted from the oncoming moving body O. Further, the travel_ECU 14 m recognizes the oncoming moving body O as an obstacle in accordance with the risk degree R, and performs preliminary collision avoidance control prior to emergency collision avoidance control in response to the oncoming moving body O recognized as the obstacle.

As a result, sufficient safety can be ensured even in a case where the oncoming moving body O, such as an oncoming vehicle, suddenly enters the traveling lane of the host vehicle M. That is, the travel_ECU 14 performs preliminary collision avoidance control in accordance with the risk degree R in response to the oncoming moving body O before the oncoming moving body O enters the target traveling region Am of the host vehicle M. Accordingly, even in a case where the oncoming moving body O suddenly travels across the lane marker and enters in front of the host vehicle M, the emergency collision avoidance control can be performed with well-prepared state.

In this case, the risk degree R is calculated outside the host vehicle M. That is, the risk degree R is calculated in the travel_ECU 14o of the oncoming moving body O itself, which is another vehicle or the like. Accordingly, even in a case where the oncoming moving body O moves on a curve or the like with poor visibility and difficult to recognize by the stereo camera 11 or the like, which is an autonomous sensor of the host vehicle M, the travel_ECU 14 m can accurately identify the behavior of the oncoming moving body O.

Further, the travel_ECU 14o respectively calculates the risk degree intermediate values Rt−2, Rt−1, Rt for the oncoming moving body O at every timing t−2, t−1, t, on the basis of the history of the relative lane marker lateral position calculated every interval (every past time T, for example) set in advance. Then, the travel_ECU 14o calculates a total value of the risk degree intermediate values Rt−2, Rt−1, Rt as the risk degree R. This makes it possible to accurately calculate the risk degree R caused by behavior such as the wandering of the oncoming moving body O.

At this time, the travel_ECU 14o respectively calculates the relative lane marker lateral positions a, b of the oncoming moving body O with respect to the left and right lane markers defining the oncoming lane. Then, the travel_ECU 14o calculates the risk degree intermediate values Rt−2, Rt−1, Rt at each timing t−2, t−1, t, on the basis of the difference Δx between the average values a_ave, b_ave of the relative lane marker lateral positions a, b calculated every interval set in advance. Accordingly, the wandering of the oncoming moving body O with respect to the center of the oncoming lane can be accurately recognized, regardless of the size of the oncoming moving body O.

In addition, the travel_ECU 14 m performs upper limit processing on the risk degree R. This makes it possible to suppress unnecessary preliminary collision avoidance control.

Further, the travel_ECU 14 m varies the control level (risk level) permitted to the preliminary collision avoidance control in accordance with the value of the longitudinal time-to-collision TTCz. This makes it possible to achieve appropriate preliminary collision avoidance control in response to the oncoming moving body O.

Herein, in the embodiment described above, the image recognition_ECU 13, the travel_ECU 14, the CP_ECU 21, the E/G_ECU 22, the T/M_ECU 23, the BK_ECU 24, the PS_ECU 25 and the like are each constituted by a known microcomputer or processor including a central processing unit (CPU), a read access memory (RAM), a read only memory (ROM), a non-volatile storage unit, and the like, and peripheral devices thereof. In the ROM, fixed data such as programs executed by the CPU and data tables or the like are stored in advance. Note that all or some of the functions of the processor may be configured by a logic circuit or an analog circuit. Further, the processing of the various kinds of programs may be realized by an electronic circuit such as a field-programmable gate array (FPGA).

Note that, in the embodiments described above, the host vehicle M and the oncoming moving body O are relative to each other, changing in accordance with the vehicle used as a reference. Accordingly, in the following description, it is possible to read "host vehicle M" as "oncoming moving body O," and read "oncoming moving body O" as "host vehicle M."

The disclosure described in the above embodiments is not limited to the embodiments, but in addition, various modifications can be made without departing from the spirit and scope of the invention in an implementation stage. Furthermore, the above embodiments include technologies in various stages and various kinds of technologies can be extracted with an appropriate combination of disclosed configuration requirements.

For example, the functions of the lateral position calculator, the risk degree calculator, and the transmitter can also be provided by infrastructure equipment (roadside equipment or the like) provided at set intervals along the road. In this case, the infrastructure equipment includes, for example, a configuration corresponding to the camera unit 10 and a configuration corresponding to the transceiver 38.

Further, when several configuration requirements are deleted from all configuration requirements illustrated in the above embodiments, if the mentioned problems can be solved and the advantageous effects can be achieved, the configuration from which the configuration requirements are deleted can be extracted as a technology.

The invention claimed is:

1. A vehicle driving assist device comprising one or more first processors configured to:
    receive, in relation to an oncoming moving body moving in an oncoming lane adjacent to a traveling lane of a vehicle and having a velocity component in a direction opposite to a traveling direction of the vehicle, a risk degree by communication with a device outside the vehicle;
    in response to determining that the vehicle is likely to collide with an obstacle, perform emergency collision avoidance control for avoiding collision of the vehicle with the obstacle; and
    recognize the oncoming moving body as the obstacle in accordance with the risk degree, and perform preliminary collision avoidance control in response to the oncoming moving body recognized as the obstacle prior to the emergency collision avoidance control, wherein
    the oncoming moving body comprises one or more second processors configured to:

recognize lane markers using a sensor of the oncoming moving body, the lane markers defining the oncoming lane in which the oncoming moving body is moving and including a left lane marker and a right lane marker opposite to the left lane marker;

calculate a left relative lane marker lateral position and a right relative lane marker lateral position every set calculation cycle, the left relative lane marker lateral position indicating a distance from the left lane marker to the oncoming moving body, the right relative lane marker lateral position indicating a distance from the right lane marker to the oncoming moving body;

determine a first behavior of the oncoming moving body during a first time period based on first left relative lane marker lateral positions and first right relative lane marker lateral positions, each first left relative lane marker lateral position indicating the calculated left relative lane marker lateral position during the first time period, each first right relative lane marker lateral position indicating the calculated right relative lane marker lateral position during the first time period;

determine a second behavior of the oncoming moving body during a second time period following the first time period based on second left relative lane marker lateral positions and second right relative lane marker lateral positions, each second left relative lane marker lateral position indicating the calculated left relative lane marker lateral position during the second time period, each first right relative lane marker lateral position indicating the calculated right relative lane marker lateral position during the second time period;

calculate a risk degree for the oncoming moving body based on the determined first behavior and the determined second behavior; and transmit the risk degree to the vehicle, and the emergency collision avoidance control and the preliminary collision avoidance control include at least one of braking control and steering control.

2. The vehicle driving assist device according to claim 1, wherein the one or more second processors are configured to:

derive a first measure of central tendency of the first left relative lane marker lateral positions;

derive a second measure of central tendency of the first right relative lane marker lateral positions;

derive a third measure of central tendency of the second left relative lane marker lateral positions;

derive a fourth measure of central tendency of the second right relative lane marker lateral positions;

derive the first behavior based on a difference between the first measure of central tendency and the third measure of central tendency; and derive the second behavior based on a difference between the second measure of central tendency and the fourth measure of central tendency.

3. The vehicle driving assist device according to claim 1, wherein the first behavior includes information on whether the oncoming moving body moves in either one of a left direction and a right direction with respect to a moving direction of the oncoming moving body during the first time period, and the second behavior includes information on whether the oncoming moving body moves in either one of a left direction and a right direction with respect to the moving direction of the oncoming moving body during the second time period.

4. The vehicle driving assist device according to claim 1, wherein the first time period and the second time period are within several seconds.

5. The vehicle driving assist device according to claim 1, wherein the one or more first processing processors are further configured to:

recognize lane markers using a sensor of the vehicle, the lane markers defining a traveling lane on which the vehicle is traveling and including a left lane marker and a right lane marker opposite to the left lane marker;

calculate a left relative lane marker lateral position and a right relative lane marker lateral position every set calculation cycle, the left relative lane marker lateral position indicating a distance from the left lane marker to the vehicle, the right relative lane marker lateral position indicating a distance from the right lane marker to the vehicle;

determine a first behavior of the vehicle during a first time period based on first left relative lane marker lateral positions and first right relative lane marker lateral positions, each first left relative lane marker lateral position indicating the calculated left relative lane marker lateral position during the first time period, each first right relative lane marker lateral position indicating the calculated right relative lane marker lateral position during the first time period;

determine a second behavior of the vehicle during a second time period following the first time period based on second left relative lane marker lateral positions and second right relative lane marker lateral positions, each second left relative lane marker lateral position indicating the calculated left relative lane marker lateral position during the second time period, each first right relative lane marker lateral position indicating the calculated right relative lane marker lateral position during the second time period;

calculate a risk degree for the vehicle based on the determined first behavior and the determined second behavior; and transmit the risk degree to the oncoming moving body moving in the oncoming lane adjacent to the traveling lane of the vehicle and having a velocity component in the direction opposite to the traveling direction of the vehicle.

6. A vehicle driving assist device comprising one or more processors configured to:

recognize lane markers using a sensor of a vehicle, the lane markers defining a traveling lane on which the vehicle is traveling and including a left lane marker and a right lane marker opposite to the left lane marker;

calculate a left relative lane marker lateral position and a right relative lane marker lateral position every set calculation cycle, the left relative lane marker lateral position indicating a distance from the left lane marker to the vehicle, the right relative lane marker lateral position indicating a distance from the right lane marker to the vehicle;

determine a first behavior of the vehicle during a first time period based on first left relative lane marker lateral positions and first right relative lane marker lateral positions, each first left relative lane marker lateral position indicating the calculated left relative lane marker lateral position during the first time period, each first right relative lane marker lateral position indicating the calculated right relative lane marker lateral position during the first time period;

determine a second behavior of the vehicle during a second time period following the first time period based on second left relative lane marker lateral positions and second right relative lane marker lateral positions, each second left relative lane marker lateral position indicating the calculated left relative lane marker lateral position during the second time period, each first right relative lane marker lateral position indicating the calculated right relative lane marker lateral position during the second time period;

calculate a risk degree for the vehicle based on the determined first behavior and the determined second behavior; and transmit the risk degree to an oncoming moving body moving in an oncoming lane adjacent to the traveling lane of the vehicle and having a velocity component in a direction opposite to a traveling direction of the vehicle, such that the risk degree causes the oncoming moving body to perform:

emergency collision avoidance control for avoiding collision with an obstacle, in response to determining that the oncoming moving body is likely to collide with the vehicle; and preliminary collision avoidance control performed prior to the emergency collision avoidance control, wherein the emergency collision avoidance control and the preliminary collision avoidance control include at least one of braking control and steering control.

7. The vehicle driving assist device according to claim 6, wherein the one or more processors are configured to:

derive a first measure of central tendency of the first left relative lane marker lateral positions;

derive a second measure of central tendency of the first right relative lane marker lateral positions;

derive a third measure of central tendency of the second left relative lane marker lateral positions;

derive a fourth measure of central tendency of the second right relative lane marker lateral positions;

derive the first behavior based on a difference between the first measure of central tendency and the third measure of central tendency; and derive the second behavior based on a difference between the second measure of central tendency and the fourth measure of central tendency.

8. The vehicle driving assist device according to claim 6, wherein the first behavior includes information on whether the vehicle moves in either one of a left direction and a right direction with respect to the traveling direction of the vehicle during the first time period, and the second behavior includes information on whether the vehicle moves in either one of a left direction and a right direction with respect to the traveling direction of the vehicle during the second time period.

9. The vehicle driving assist device according to claim 6, wherein the first time period and the second time period are within several seconds.

10. A vehicle driving assist system comprising one or more second processors configured to:

recognize lane markers using a sensor of an oncoming moving body moving in an oncoming lane adjacent to a traveling lane of a vehicle and having a velocity component in a direction opposite to a traveling direction of the vehicle, the lane markers defining the oncoming lane in which the oncoming moving body is moving and including a left lane marker and a right lane marker opposite to the left lane marker;

calculate a left relative lane marker lateral position and a right relative lane marker lateral position every set calculation cycle, the left relative lane marker lateral position indicating a distance from the left lane marker to the oncoming moving body, the right relative lane marker lateral position indicating a distance from the right lane marker to the oncoming moving body;

determine a first behavior of the oncoming moving body during a first time period based on first left relative lane marker lateral positions and first right relative lane marker lateral positions, each first left relative lane marker lateral position indicating the calculated left relative lane marker lateral position during the first time period, each first right relative lane marker lateral position indicating the calculated right relative lane marker lateral position during the first time period;

determine a second behavior of the oncoming moving body during a second time period following the first time period based on second left relative lane marker lateral positions and second right relative lane marker lateral positions, each second left relative lane marker lateral position indicating the calculated left relative lane marker lateral position during the second time period, each first right relative lane marker lateral position indicating the calculate right relative lane marker lateral position during the second time period;

calculate a risk degree for the oncoming moving body based on the determined first behavior and the determined second behavior; and transmit the risk degree to the vehicle; and one or more first processors mounted on the vehicle and configured to:

receive the risk degree;

perform, in response to determining that the vehicle is likely to collide with an obstacle, emergency collision avoidance control for avoiding collision of the vehicle with the obstacle; and recognize the oncoming moving body as the obstacle in accordance with the risk degree, and perform preliminary collision avoidance control in response to the oncoming moving body recognized as the obstacle prior to the emergency collision avoidance control, wherein the emergency collision avoidance control and the preliminary collision avoidance control include at least one of braking control and steering control.

11. The vehicle driving assist system according to claim 10, wherein the one or more second processors are configured to calculate a first risk degree intermediate value for the oncoming moving body based on the first left relative lane marker lateral positions and the first right relative lane marker lateral positions, calculate a second risk degree intermediate value for the oncoming moving body based on the second left relative lane marker lateral positions and the second right relative lane marker lateral positions, and calculate the risk degree based on adding the first risk degree intermediate value and the second risk degree intermediate value.

12. The vehicle driving assist system according to claim 11, wherein the one or more second processors are configured to perform upper limit processing in which a preset value is set as an upper limit of the risk degree.

13. The vehicle driving assist system according to claim 12, wherein the one or more first processors are configured to vary a control level permitted to the preliminary collision avoidance control based on a relative distance and a relative velocity of the vehicle and the oncoming moving body in a longitudinal direction of the vehicle.

14. The vehicle driving assist system according to claim 11, wherein the one or more first processors are configured to vary a control level permitted to the preliminary collision avoidance control based on a relative distance and a relative velocity of the vehicle and the oncoming moving body in a longitudinal direction of the vehicle.

15. The vehicle driving assist system according to claim 10, wherein the one or more first processors are configured to vary a control level permitted to the preliminary collision avoidance control based on a relative distance and a relative velocity of the vehicle and the oncoming moving body in a longitudinal direction of the vehicle.

16. The vehicle driving assist system according to claim 10, wherein the one or more second processors are configured to:
 derive a first measure of central tendency of the first left relative lane marker lateral positions;
 derive a second measure of central tendency of the first right relative lane marker lateral positions;
 derive a third measure of central tendency of the second left relative lane marker lateral positions;
 derive a fourth measure of central tendency of the second right relative lane marker lateral positions;
 derive the first behavior based on a difference between the first measure of central tendency and the third measure of central tendency; and
 derive the second behavior based on a difference between the second measure of central tendency and the fourth measure of central tendency.

17. The vehicle driving assist system according to claim 10, wherein
 the first behavior includes information on whether the oncoming moving body moves in either one of a left direction and a right direction with respect to a moving direction of the oncoming moving body during the first time period, and
 the second behavior includes information on whether the oncoming moving body moves in either one of a left direction and a right direction with respect to the moving direction of the oncoming moving body during the second time period.

18. The vehicle driving assist system according to claim 10, wherein the first time period and the second time period are within several seconds.

* * * * *